United States Patent
Nakamura et al.

(12) 
(10) Patent No.: US 11,088,532 B2
(45) Date of Patent: Aug. 10, 2021

(54) CONTROL DEVICE

(71) Applicant: DENSO CORPORATION, Kariya (JP)

(72) Inventors: Kouichi Nakamura, Kariya (JP); Hideki Kabune, Kariya (JP); Atsuko Oka, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/835,841

(22) Filed: Mar. 31, 2020

(65) Prior Publication Data
US 2020/0321769 A1    Oct. 8, 2020

(30) Foreign Application Priority Data

Apr. 2, 2019    (JP) .............................. JP2019-070491

(51) Int. Cl.
*H02H 3/28*    (2006.01)
*H02H 7/08*    (2006.01)
*B62D 5/04*    (2006.01)

(52) U.S. Cl.
CPC ................ *H02H 3/28* (2013.01); *H02H 7/08* (2013.01); *B62D 5/0463* (2013.01)

(58) Field of Classification Search
CPC ....................................................... H02H 3/28
See application file for complete search history.

(56) References Cited

U.S. PATENT DOCUMENTS

| 2014/0265954 A1 | 9/2014 | Kobayashi |
| 2015/0318848 A1* | 11/2015 | Kandah ................ H03K 17/165 363/132 |

FOREIGN PATENT DOCUMENTS

| JP | 2014-180070 A | 9/2014 |
| JP | 5811363 B2 | 10/2015 |
| JP | 2018-042403 A | 3/2018 |
| JP | 2018-129996 A | 8/2018 |

* cited by examiner

*Primary Examiner* — Peter M Novak
(74) *Attorney, Agent, or Firm* — Maschoff Brennan

(57) ABSTRACT

In a control device, control circuit units are connected to separate circuit power sources and to separate grounds. Ground monitor circuits respectively have a first resistor with one end connected to a voltage source, a second resistor with one end connected to an input terminal of a corresponding control circuit unit, and a capacitor. Among the one end of the first resistor, an other end of the first resistor, and the other end of the second resistor, at least one is connected to the subject system, and at least one is connected to an other system, and the control circuit unit monitors a ground abnormality of the other system based on a terminal voltage of the input terminal to which the second resistor is connected.

14 Claims, 17 Drawing Sheets

CONTROL DEVICE

CROSS REFERENCE TO RELATED APPLICATION

The present application is based on and claims the benefit of priority of Japanese Patent Application No. 2019-070491, filed on Apr. 2, 2019, the disclosure of which is incorporated herein by reference.

TECHNICAL FIELD

The present disclosure generally relates to a control device.

BACKGROUND INFORMATION

The related art includes a motor control device in which an external power source is made redundant. In the related art, individual external power sources are connected to two ECUs via individual power ground lines, respectively, and the configuration of the external power source is made redundant along with the configuration of the motor control system.

In the related art, an abnormality detection unit is provided in the motor control device, which detects an abnormality thereof when a ground abnormality occurs in any of the ECUs. In such configuration, when the motor control device is applied to a device or an apparatus energized with a large current such as an electric power steering apparatus, there is a possibility that the ground abnormality may be not properly detected due to noise in the circuit configuration of the abnormality detection unit.

SUMMARY

It is an object of the present disclosure to provide a control device capable of appropriately detecting a ground abnormality.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
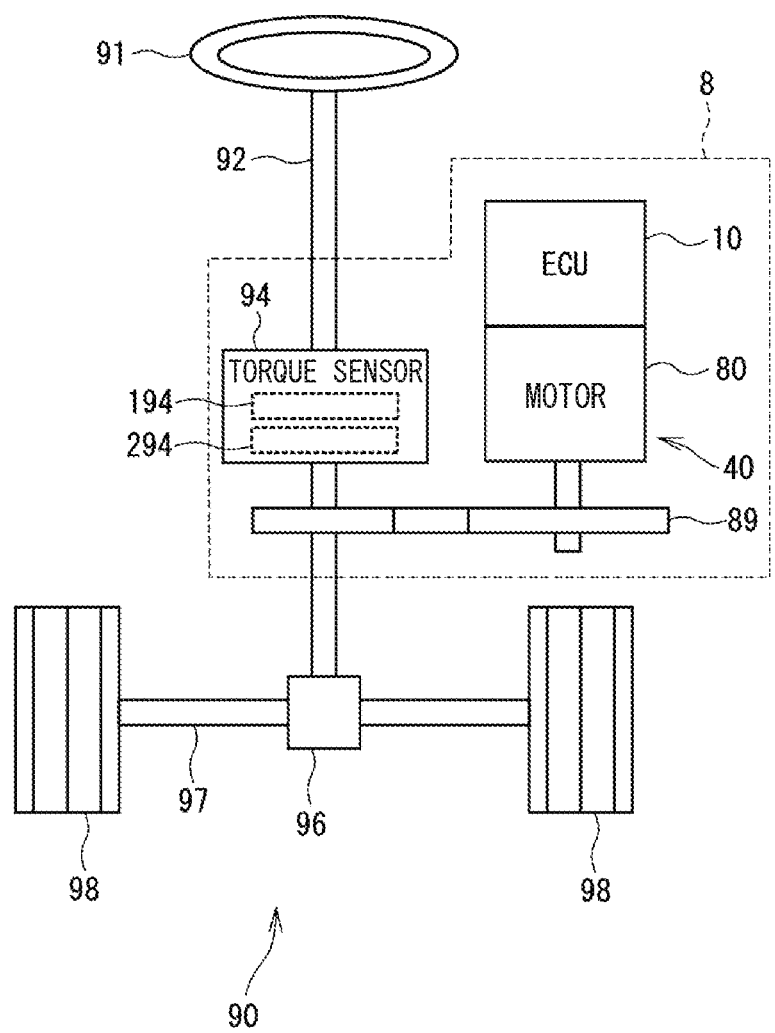
FIG. 1 is a schematic diagram of a steering system according to a first embodiment.
Figure 2:
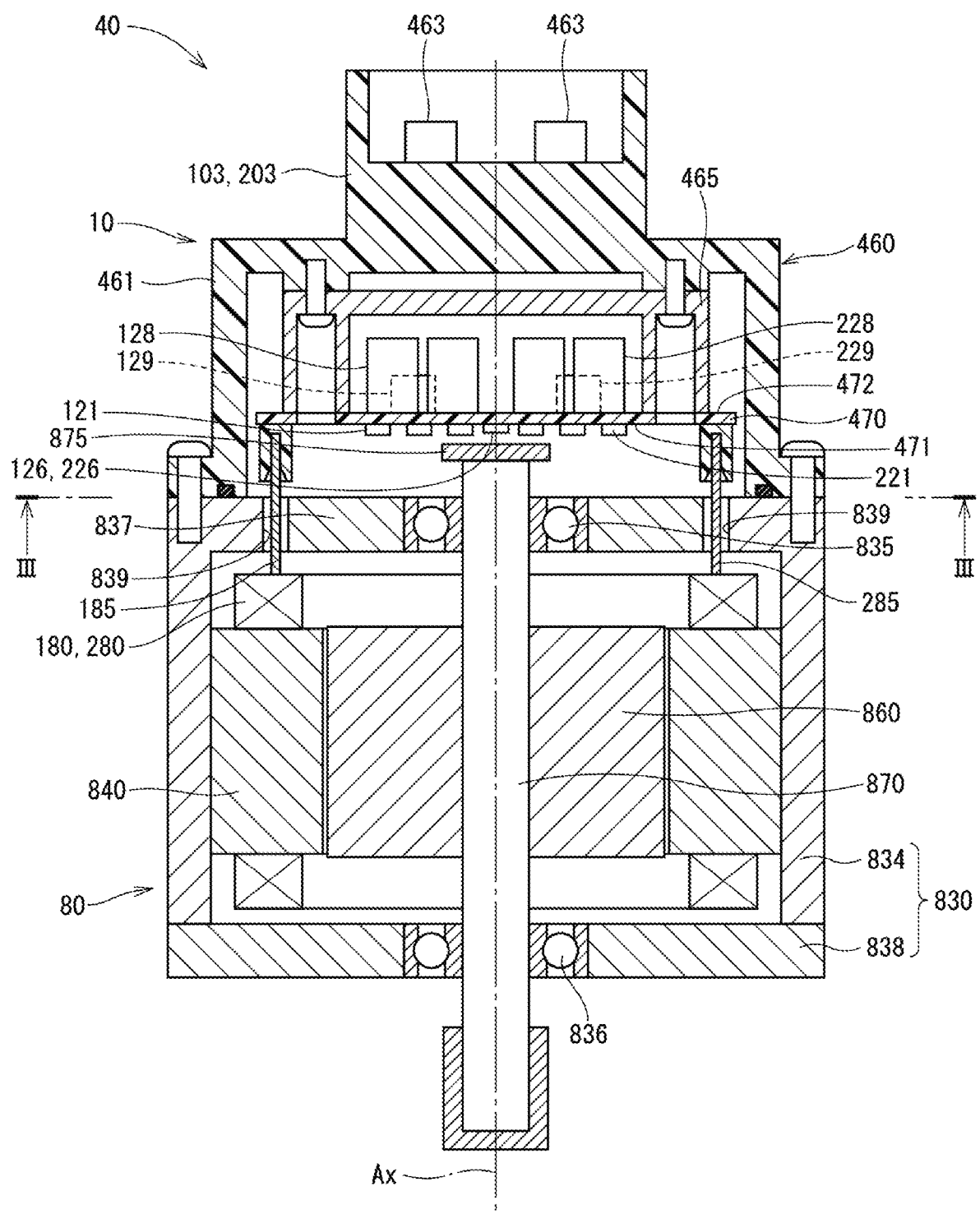
FIG. 2 is a cross-sectional view of a driving device according to the first embodiment.

Hereinafter, a control device according to the present disclosure and an electric power steering apparatus using the same is described with reference to the drawings. In a plurality of embodiments below, a substantially identical component is designated by the same reference numeral to eliminate duplicated description.

First Embodiment

The first embodiment is illustrated in FIGS. 1 to 12. As shown in FIG. 1, an electronic control unit, or ECU, 10 as a control device is a motor control device that controls a drive of a motor 80 (i.e., a rotating electrical machine), and is applied to, for example, an electric power steering apparatus 8 for assisting a steering operation of a vehicle together with the motor 80.

FIG. 1 shows a configuration of a steering system 90 including the electric power steering apparatus 8. The steering system 90 includes a steering wheel 91 which is a steering member, a steering shaft 92, a pinion gear 96, a rack shaft 97, road wheels 98, the electric power steering apparatus 8 and the like.

The steering wheel 91 is connected to the steering shaft 92. A torque sensor 94 is provided on the steering shaft 92 to detect a steering torque. The torque sensor 94 has a first sensor unit 194 and a second sensor unit 294, and each sensor capable of detecting its own failure is duplicated. The pinion gear 96 is provided at an axial end of the steering shaft 92. The pinion gear 96 engages with the rack shaft 97. A pair of road wheels 98 is coupled to both ends of the rack shaft 97 via, for example, tie rods.

When a driver of the vehicle rotates the steering wheel 91, the steering shaft 92 connected to the steering wheel 91 rotates. A rotational movement of the steering shaft 92 is converted to a linear movement of the rack shaft 97 by the pinion gear 96. The pair of road wheels 98 is steered to an angle corresponding to a displacement amount of the rack shaft 97.

The electric power steering apparatus 8 includes the motor 80, a reduction gear 89, the ECU 10 and the like. The reduction gear 89 is a power transmission mechanism that reduces the rotation speed of the motor 80 and transmits the reduced number of rotations to the steering shaft 92. The electric power steering apparatus 8 of the present embodiment is a so-called column-assist type, but it may alternatively be a rack-assist type that transmits the rotation of the motor 80 to the rack shaft 97. In the present embodiment, the steering shaft 92 is a driven object.

As shown in FIG. 1 to FIG. 4, the motor 80 outputs a whole or a part of an assist torque required for a steering operation. The motor 80 is driven by electric power supplied from batteries 101 and 201 provided as direct current power sources to rotate the reduction gear 89 in forward and backward directions. The motor 80 is a three-phase brushless motor and has a rotor 860 and a stator 840.

The motor 80 has a first motor winding 180 and a second motor winding 280 respectively as a winding set. The motor windings 180 and 280 have the same electrical characteristics and are wound about the stator 840 with shifted electrical angles by 30 degrees. Correspondingly, phase currents are controlled to be supplied to the motor windings 180 and 280 such that the phase currents have a phase difference φ of 30 degrees. By optimizing a current supply phase difference, the output torque is improved. In addition, a sixth-order torque ripple is reduced, thereby reducing noise and vibration. In addition, since heat is distributed and leveled by the distribution of the electric current, it is possible to reduce temperature-dependent system errors such as a detection value of each sensor and a torque, while increasing the amount of suppliable electric current to each of the winding sets. The motor windings 180, 280 may have respectively different electrical characteristics.

Hereinafter, a combination of a first inverter unit 120 and a first control circuit unit 150 and the like, which are related to the energization control for the first motor winding 180, is referred to as a first system L1, and a combination of a second inverter unit 220 and a second control circuit unit 250 and the like, which are related to the energization control for the second motor winding 280, is referred to as a second system L2. The configuration related to the first system L1 is basically indicated with a reference numeral of 100 order numbers, and the configuration related to the second system L2 is basically indicated with a reference numeral of 200 order numbers. In the first system L1 and the second system L2, same or similar configuration is indicated with same reference numerals in the least significant two digits. For the other configuration described below, the term "first" is indicated by a suffix "1," and the term "second" is indicated by a suffix "2."

In a driving device 40, the ECU 10 is integrally provided on one side in the axial direction of the motor 80, which may be called as a machine-electronics integrated type motor. The motor 80 and the ECU 10 may alternatively be provided separately in two bodies. The ECU 10 is positioned coaxially with an axis Ax of the shaft 870 on the side opposite to an output shaft of the motor 80. The ECU 10 may alternatively be provided on the output shaft side of the motor 80. By adopting the machine-electronics integrated configuration, it is possible to efficiently arrange the ECU 10 and the motor 80 in a vehicle having restricted mounting space.

The motor 80 includes the stator 840, the rotor 860 and a housing 830 which houses the stator 840 and the rotor 860 therein. The stator 840 is fixed to the housing 830 and the motor windings 180 and 280 are wound thereon. The rotor 860 is provided radially inside the stator 840 to be rotatable relative to the stator 840.

The shaft 870 is fitted in the rotor 860 to rotate integrally with the rotor 860. The shaft 870 is rotatably supported by the housing 830 by bearings 835 and 836. An end portion of the shaft 870 on an ECU 10 side protrudes from the housing 830 toward the ECU 10. A magnet 875 is provided at the axial end of the shaft 870 on the ECU 10 side.

The housing 830 has a bottomed cylindrical case 834, which has a rear frame end 837, and a front frame end 838 provided on an open side of the case 834. The case 834 and the front frame end 838 are fastened to each other by bolts or the like. Lead wire insertion holes 839 are formed in the rear frame end 837. Lead wires 185 and 285 connected to each phase of the motor windings 180 and 280 are inserted through the lead wire insertion holes 839. The lead wires 185 and 285 are taken out from the lead wire insertion holes 839 toward the ECU 10 and connected to a circuit board 470.

The ECU 10 includes a cover 460, a heat sink 465 fixed to the cover 460, the circuit board 470 fixed to the heat sink 465 and other electronic components mounted on the circuit board 470.

The cover 460 protects the electronic components from external impacts and prevents dust, water or the like from entering into the ECU 10. In the cover 460, a cover main body 461 and connector units 103 and 203 are integrally formed thereon. The connector units 103 and 203 may alternatively be separate from the cover main body 461. Terminals 463 of the connector units 103 and 203 are connected to the circuit board 470 via wirings (not shown) or the like. The number of connectors and the number of terminals may be changed according to the number of signals and the like. The connector units 103 and 203 are provided at the end portion in the axial direction of the driving device 40 and is open on the side opposite to the motor 80.

The circuit board 470 is, for example, a printed circuit board and is positioned to face the rear frame end 837. On the circuit board 470, the electronic components of the first and second systems are mounted independently for each system so that the two systems are provided in a fully-redundant configuration. In the first embodiment, the electronic components are mounted on one circuit board 470, but the electronic components may alternatively be mounted on a plurality of circuit boards.

Figure 3:
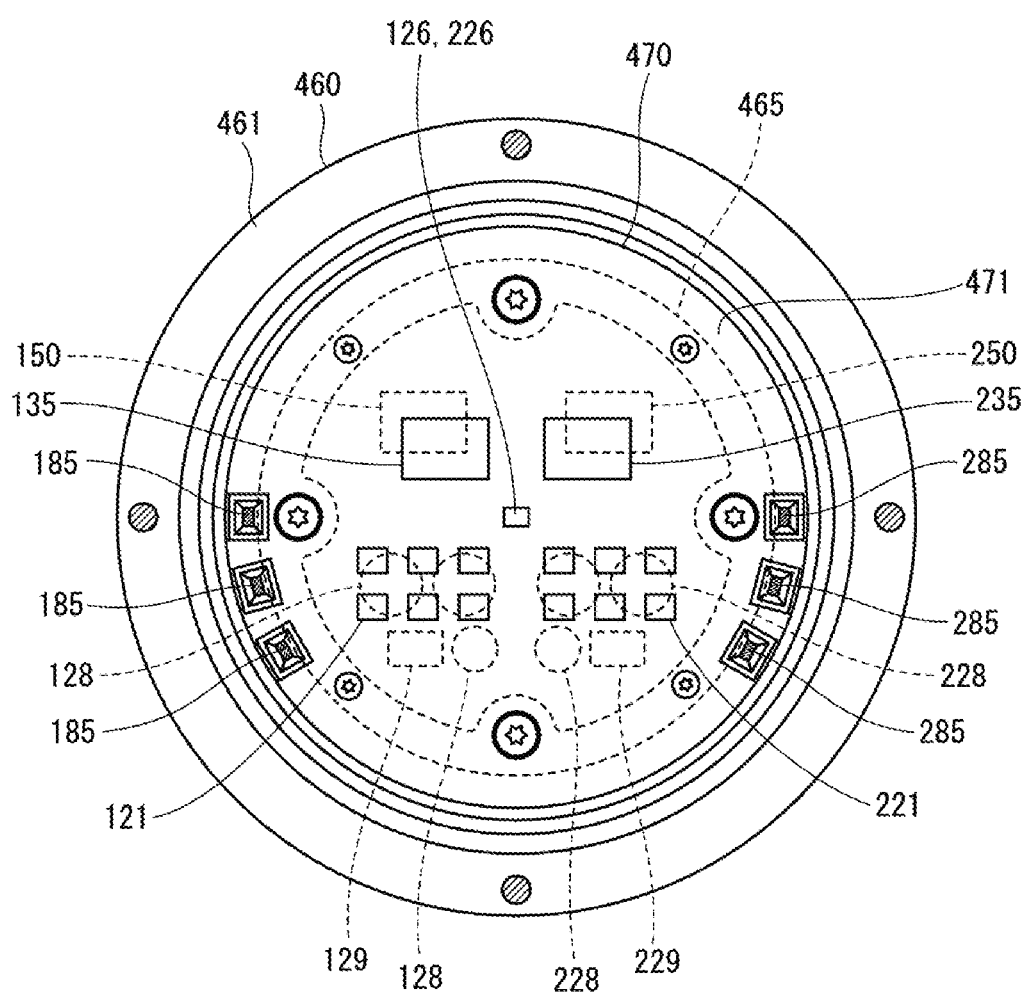
FIG. 3 is a cross-sectional view taken along a line III-III in FIG. 2.

Of the two principal surfaces of the circuit board 470, one surface facing the motor 80 is referred to as a motor-side surface 471 and the other surface opposite to (i.e., facing away from) the motor 80 is referred to as a cover-side surface 472. As shown in FIG. 3, switching elements 121 configuring the inverter unit 120, switching elements 221 configuring the inverter unit 220, angle sensors 126, 226, custom ICs 135, 235 and the like are mounted on the motor-side surface 471. The angle sensors 126 and 226 are mounted at a position facing the magnet 875 to be able to detect a change in the magnetic field caused by the rotation of the magnet 875.

On the cover-side surface 472, capacitors 128, 228, inductors 129, 229, and microcomputers serving as the control circuit units 150, 250 are mounted. In FIG. 3, reference numerals 150 and 250 are assigned to the microcomputers provided as the control circuit units 150 and 250, respectively. The capacitors 128 and 228 smoothen electrical power input from the batteries 101 and 201. The capacitors 128 and 228 assist electric power supply to the motor 80 by storing electric charge therein. The capacitors 128, 228 and the inductors 129, 229 provide filter circuits, respectively, to reduce noises transmitted from other devices which share the battery, and also to reduce noises transmitted to the other devices, which share the battery, from the driving device 40. Although not shown in FIG. 3, power supply relays 122, 222, motor relays 125, 225, current sensors 127, 227 and the like are also mounted on the motor-side surface 471 or the cover-side surface 472.

Figure 4:
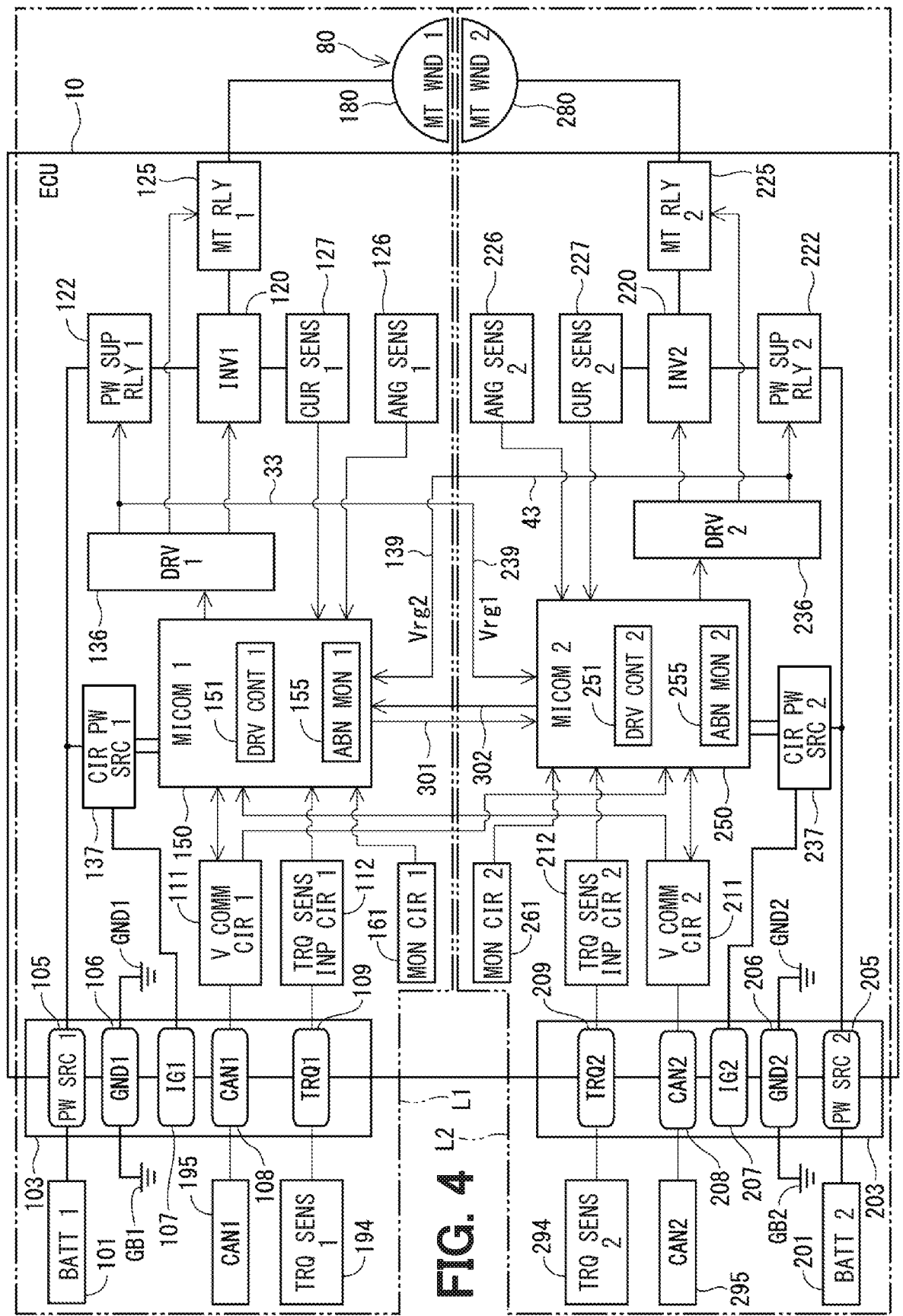
FIG. 4 is a block diagram of an electronic control unit (ECU) according to the first embodiment.

As shown in FIG. 4, the ECU 10 includes the inverter units 120, 220 and the control circuit units 150, 250. In the drawings and the like, a "control circuit unit" is appropriately described as a "microcomputer" or "uP." The ECU 10 is provided with the connector units 103 and 203. The first connector unit 103 is provided with a first power supply terminal 105, a first ground terminal 106, a first IG terminal 107, a first communication terminal 108, and a first torque terminal 109.

The first power supply terminal 105 is connected to the first battery 101 via a fuse (not shown). The electric power supplied from a positive electrode of the first battery 101 via the first power supply terminal 105 is supplied to the first motor winding 180 via the power supply relay 122, the inverter unit 120, and the motor relay 125. The first ground terminal 106 is connected to a first ground GND1 that is a first system ground inside the ECU 10 and a first external ground GB1 that is a first system ground outside the ECU 10. In a vehicle system, the metal body is a common GND plane. The first external ground GB1 indicates one of the connection points on the GND plane, and a negative electrode of the second battery 201 is also connected to the connection point on the same common GND plane.

The first IG terminal 107 is connected to the positive electrode of the first battery 101 via a first switch whose on/off-control is performed in conjunction with a vehicle start switch such as an ignition (IG) switch. The electric power supplied from the first battery 101 via the first IG terminal 107 is supplied to the first custom IC 135. The first custom IC 135 includes a first driver circuit 136, a first circuit power source 137, a microcomputer monitor (not shown), a current monitor amplifier (not shown), and the like.

The first communication terminal 108 is connected to a first vehicle communication circuit 111 and a first vehicle communication network 195. The first vehicle communication network 195 and the first control circuit unit 150 are connected via the first vehicle communication circuit 111 so that transmission and reception of data are performable. Further, the first vehicle communication network 195 and the second control circuit unit 250 are connected so that only reception of data by the second control circuit unit 250 is performable. That is, even if the second control circuit unit 250 fails to operate, the first vehicle communication network 195 including the first control circuit unit 150 is not affected.

The first torque terminal 109 is connected to the first sensor unit 194 of the torque sensor 94. The detection value of the first sensor unit 194 is input to the first control circuit unit 150 via the first torque terminal 109 and a first torque sensor input circuit 112. Here, the first sensor unit 194 and the first control circuit unit 150 are configured such that a failure involving the torque sensor input circuit is detectable.

The second connector unit 203 is provided with a second power supply terminal 205, a second ground terminal 106, a second IG terminal 207, a second communication terminal 208, and a second torque terminal 209. The second power supply terminal 205 is connected to a positive electrode of the second battery 201 via a fuse (not shown). The electric power supplied from the positive electrode of the second battery 201 via the second power supply terminal 205 is supplied to the second motor winding 280 via the power supply relay 222, the inverter unit 220, and the motor relay 225. The second ground terminal 206 is connected to a second ground GND2 that is a second system ground inside the ECU 10 and a second external ground GB2 that is a second system ground outside the ECU 10. In the vehicle system, the metal body is a common GND plane. The second external ground GB2 indicates one of the connection points on the GND plane, and a negative electrode of the second battery 201 is also connected to the connection point on the GND plane. Here, at least different systems are configured not to be connected to the same connection point on the GND plane.

The second IG terminal 207 is connected to the positive electrode of the second battery 201 via a second switch whose on/off-control is performed in conjunction with the start switch of the vehicle. The electric power supplied from the second battery 201 via the second IG terminal 207 is supplied to the second custom IC 235. The second custom IC 235 includes a second driver circuit 236, a second circuit power source 237, a microcomputer monitor (not shown), a current monitor amplifier (not shown), and the like.

The second communication terminal 208 is connected to a second vehicle communication circuit 211 and a second vehicle communication network 295. The second vehicle communication network 295 and the second control circuit unit 250 are connected via the second vehicle communication circuit 211 so that transmission and reception of data are performable. Further, the second vehicle communication network 295 and the first control circuit unit 150 are connected so that only reception by the first control circuit unit 150 is performable. That is, even if the first control circuit unit 150 fails to operate, the second vehicle communication network 295 including the second control circuit unit 250 is not affected.

The second torque terminal 209 is connected to the second sensor unit 294 of the torque sensor 94. The detection value of the second sensor unit 294 is input to the second control circuit unit 250 via the second torque terminal 209 and a second torque sensor input circuit 212. Here, the second sensor unit 294 and the second control circuit unit 150 are configured such that a failure involving the torque sensor input circuit is detectable.

In FIG. 4, the communication terminals 108 and 208 are connected to separate vehicle communication networks 195 and 295, respectively, but may also be connected to the same vehicle communication network. Further, regarding the vehicle communication networks 195 and 295 in FIG. 4, CAN (controller area network) is exemplified. However, any other communication standard such as CAN-FD (CAN with flexible data rate), FlexRay or the like may also be employed.

The first inverter unit 120 is a three-phase inverter having the switching elements 121, and converts electric power of the first motor winding 180. The second inverter unit 220 is a three-phase inverter having the switching elements 221, and converts electric power of the second motor winding 280.

The first power supply relay 122 is provided at a position between the first power supply terminal 105 and the first inverter unit 120. The first motor relay 125 is provided in each phase at a position between the first inverter unit 120 and the first motor winding 180. The second power supply relay 222 is provided in each phase at a position between the second power supply terminal 205 and the second inverter unit 220. The second motor relay 225 is provided at a position between the second inverter unit 220 and the second motor winding 180.

Figure 5:
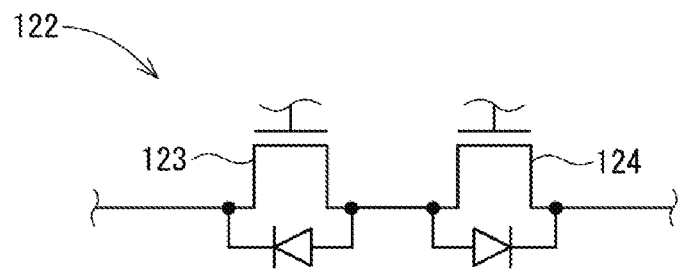
FIG. 5 is a circuit diagram of a power supply relay according to the first embodiment.

In the present embodiment, the switching elements 121 and 221, the power supply relays 122 and 222, and the motor relays 125 and 225 are all implemented as a MOSFET, but other elements such as IGBTs may alternatively be used. As shown in FIG. 5, in case that the first power supply relay 122 is configured by an element such as a MOSFET having a parasitic diode, two elements 123 and 124 are connected preferably in series so that the directions of the parasitic diodes are reversed. The second power supply relay 222 is configured in the same way, although not shown. In such manner, even when the batteries 101 and 201 are erroneously connected in the reverse direction, it is possible to prevent a reverse current from flowing. The power supply relays 122 and 222 may also be mechanical relays.

As shown in FIG. 4, on/off operations of the first switching element 121, the first power supply relay 122 and the first motor relay 125 are controlled by the first control circuit unit 150. On/off operations of the second switching element 221, the second power supply relay 222 and the second motor relay 225 are controlled by the second control circuit unit 250.

The first angle sensor 126 detects a rotation angle of the motor 80, and outputs the detection value to the first control circuit unit 150. The first angle sensor 126 detects a rotation angle of the motor 80, and outputs the detection value to the second control circuit unit 250. The first angle sensor 126 and the first control circuit unit 150, and the second angle sensor 226 and the second control circuit unit 250 are respectively configured such that a failure involving the angle sensor input circuit is detectable.

The first current sensor 127 detects an electric current supplied to each phase of the first motor winding 180. The detection value of the first current sensor 127 is amplified by an amplifier circuit in the custom IC 135, and is output to the first control circuit unit 150. The second current sensor 227 detects an electric current supplied to each phase of the second motor winding 280. The detection value of the second current sensor 227 is amplified by an amplifier circuit in the custom IC 235 and output to the second control circuit unit 250.

The first driver circuit 136 outputs drive signals to each element for driving the first switching element 121, the first power supply relay 122 and the first motor relay 125 based on control signals from the first control circuit unit 150. The second driver circuit 236 outputs drive signals to each element for driving the second switching element 221, the second power supply relay 222 and the second motor relay 225 based on control signals from the second control circuit unit 250.

Each of the control circuit units 150 and 250 is mainly composed of a microcomputer and the like, and internally includes, although not shown in the drawing, a CPU, a ROM, a RAM, an I/O, a bus line for connecting those components, and the like. Processes performed by each of the control circuit units 150 and 250 may be software processing or may be hardware processing, among which the software processing may be implemented by causing the CPU to execute a program stored in advance in a memory device such as a ROM, that is, in a computer-readable, non-transitory, tangible storage medium, and the hardware processing may be implemented by a special purpose electronic circuit. Here, the first control circuit unit 150 and the second control circuit unit 250 are respectively configured to be capable of detecting their own failures by using, for example, a lock-step dual microcomputer or the like.

The control circuit units 150 and 250 are respectively connected to the circuit power sources 137 and 237, and include an analog-digital converter (hereinafter referred to as "ADC") not shown. In the drawing, the circuit power sources 137 and 237 are referred to as VCC1 and VCC2. The control circuit units 150 and 250 are respectively provided with an ADREF+ terminal connected to a high potential side ADC reference potential and an ADREF− terminal connected to a low potential side ADC reference potential (see FIG. 6).

The first control circuit unit 150 includes a drive control unit 151 and an abnormality monitor unit 155. The drive control unit 151 controls supply of electric current to the first motor winding 180 by controlling the on/off operation of the first switching element 121. The drive control unit 151 controls the on/off operations of the first power supply relay 122 and the first motor relay 125.

The abnormality monitor unit 155 detects a ground abnormality based on the detection value of a ground monitor circuit 161. In addition, the abnormality monitor unit 155 monitors abnormality of the first system L1, which is a subject system (i.e., a subject of control by the control circuit unit 150), together with the first custom IC 135. When abnormality that should stop the subject system occurs, the first control circuit unit 150 turns off one or more of the first inverter unit 120, the first power supply relay 122, and the first motor relay 125.

The second control circuit unit 250 includes a drive control unit 251 and an abnormality monitor unit 255. The drive control unit 251 controls supply of electric current to the second motor winding 280 by controlling the on/off operation of the second switching element 221. The drive control unit 151 controls the on/off operations of the second power supply relay 222 and the second motor relay 225.

The abnormality monitor unit 255 detects a ground abnormality based on the detection value of the ground monitor circuit 261. In addition, the abnormality monitor unit 255 monitors abnormality of the second system L2, which is the subject system, together with the second custom IC 235. When abnormality that should stop the subject system occurs, the second control circuit unit 250 turns off one or more of the second inverter unit 220, the second power supply relay 222, and the second motor relay 225.

The first control circuit unit 150 monitors a communication state with the second control circuit unit 250 and an operation state of the second system L2. As a method of monitoring, the first control circuit unit 150 monitors the state of at least one of (i) a circuit (e.g., the second inverter unit 220, the second power supply relay 222, and the second motor relay 225) and (ii) a signal line 302, the operation of which should be stopped when abnormality is detected in the second system L2, for a determination of whether an emergency stop is caused therein. In the present embodiment, an other system relay monitor circuit 139 is provided to obtain a second relay gate signal Vrg2 output from the second driver circuit 236 to the second power supply relay 222, for monitoring the state of the second power supply relay 222 based on the second relay gate signal Vrg2. Hereinafter, information obtained from the other system relay monitor circuit is referred to as other system relay information, monitoring of the operation state of the other system based on the other system relay information is referred to as other system relay monitoring, and the monitored relay is referred to as an other system relay.

The second control circuit unit 250 monitors the communication state with the first control circuit unit 150 and the operation state of the first system L1. As a method for monitoring, the second control circuit unit 250 monitors the state of at least one of (i) a circuit (e.g., the first inverter unit 120, the first power supply relay 122, and the first motor relay 125) and (ii) a signal line 30, the operation of which should be stopped system when abnormality in the first system L1 is detected, for a determination of whether an emergency stop has is caused therein. In the present embodiment, an other system relay monitor circuit 239 is provided to obtain a first relay gate signal Vrg1 output from the first driver circuit 136 to the first power supply relay 122, for monitoring the state of the first power supply relay 122 based on the first relay gate signal Vrg1. Instead of using the relay gate signal, an intermediate voltage between the two elements 123 and 124 constituting the power supply relay 122, a relay drive signal output from the control circuit unit 150, or an after-relay voltage at a position between the power supply relay 122 and the inverter unit 120 may be used for monitoring the other system. Monitoring of the second system L2 by the first control circuit unit 150 is configured in the same manner.

The first control circuit unit 150 and the second control circuit unit 250 are connected by the signal lines 301 and 302 to be capable of transmitting and receiving information by inter-microcomputer communications. The signal line 301 has the first control circuit unit 150 on an output side, and has the second control circuit unit 250 on an input side. The signal line 302 has the second control circuit unit 250 on an output side, and has the first control circuit unit 150 on an input side. That is, the input and output directions of the signal lines 301 and 302 are opposite to each other.

In the present embodiment, the state of the power supply relays 122 and 222 is monitored for the monitoring of the state of the other system. Here, when a ground abnormality such as floating ground potential, ground disconnection or the like occurs in one system, in an observation from the other system, the power supply relays 122 and 222 may falsely be observed as being turned on from the other system, and the state of the other system may possibly be mis-determined.

Further, communication failure may occur due to floating of the ground. Therefore, in the present embodiment, the ground monitor circuits 161 and 261 are provided to monitor the state of the ground potential of the subject system and the ground potential of the other system.

Figure 6:
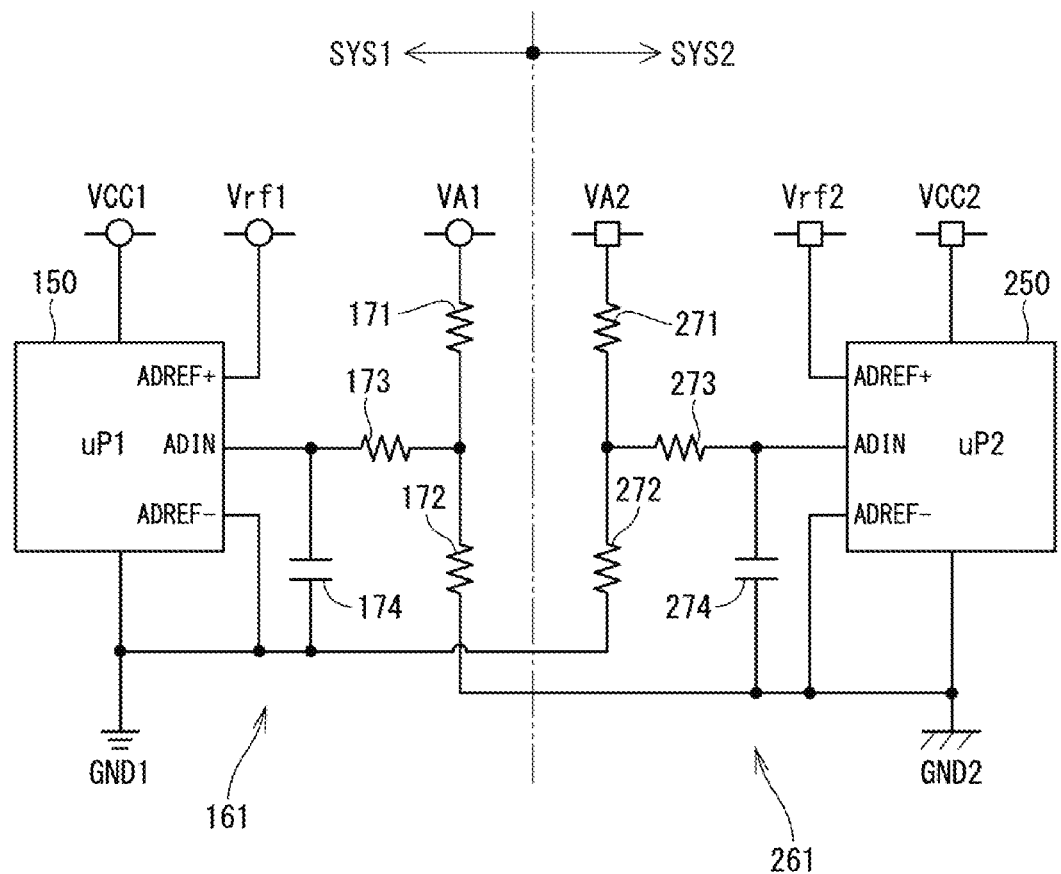
FIG. 6 is a circuit diagram of a ground monitor circuit according to the first embodiment.

The ground monitor circuits 161 and 261 are shown in FIG. 6. The first ground monitor circuit 161 includes resistors 171 to 173 and a capacitor 174. The resistors 171 and 172 constitute a voltage dividing resistor, and the resistor 173 and the capacitor 174 constitute a filter circuit. By providing a filter circuit, it is possible to reduce noise in the detection value.

The resistor 171 has one end connected to a first pull-up resistor power source and an other end connected to the resistor 172. The resistor 172 has one end connected to the resistor 171 and an other end connected to the second ground GND2, which is an other system ground. The resistor 173 has one end connected to an ADIN input terminal of the first control circuit unit 150 and an other end connected to a position between the resistors 171 and 172. The first control circuit unit 150 divides an input voltage of the ADIN input terminal by MSB, and converts it to a digital value. Hereinafter, the value of the ADIN input terminal voltage after digital conversion is referred to as an ADC conversion value.

The capacitor 174 has a high potential side connected to a position between the resistor 173 and the ADIN input terminal of the first control circuit unit 150, and a low potential side connected to the first ground GND1. More specifically, the low potential side of the capacitor 174 is connected to a position between an other end of a resistor 272 to be described later and the ADREF− terminal of the first control circuit unit 150.

The second ground monitor circuit 261 includes resistors 271 to 273 and a capacitor 274. The resistors 271 and 272 constitute a voltage dividing resistor, and the resistor 273 and the capacitor 274 constitute a filter circuit. By providing a filter circuit, it is possible to reduce noise in the detection value.

The resistor 271 has one end connected to a second pull-up resistor power source and an other end connected to the resistor 272. The resistor 272 has one end connected to the resistor 271 and an other end connected to the first ground GND1, which is an other system ground. The resistor 273 has one end connected to an ADIN input terminal of the second control circuit unit 250 and an other end connected to a position between the resistors 271 and 272. The second control circuit unit 250 divides the input voltage of the ADIN input terminal by MSB, and converts it to a digital value.

The capacitor 274 has a high potential side connected to a position between the resistor 273 and the ADIN input terminal of the second control circuit unit 250, and a low potential side connected to the second ground GND2. More specifically, the low potential side of the capacitor 274 is connected to a position between the other end of the resistor 272 and the ADREF− terminal of the second control circuit unit 250.

In the drawing, an ADC input reference voltage of the first system L1 is indicated as Vrf1, a pull-up resistor power source voltage is indicated as VA1, an ADC input reference voltage of the second system L2 is indicated as Vfr2, and a pull-up resistor power source voltage is indicated as VA2. The ADC input reference voltage Vrf1 and the pull-up resistor power source voltage VA1 may be the same or may be different from each other. The same applies to the second system L2.

Figure 7:
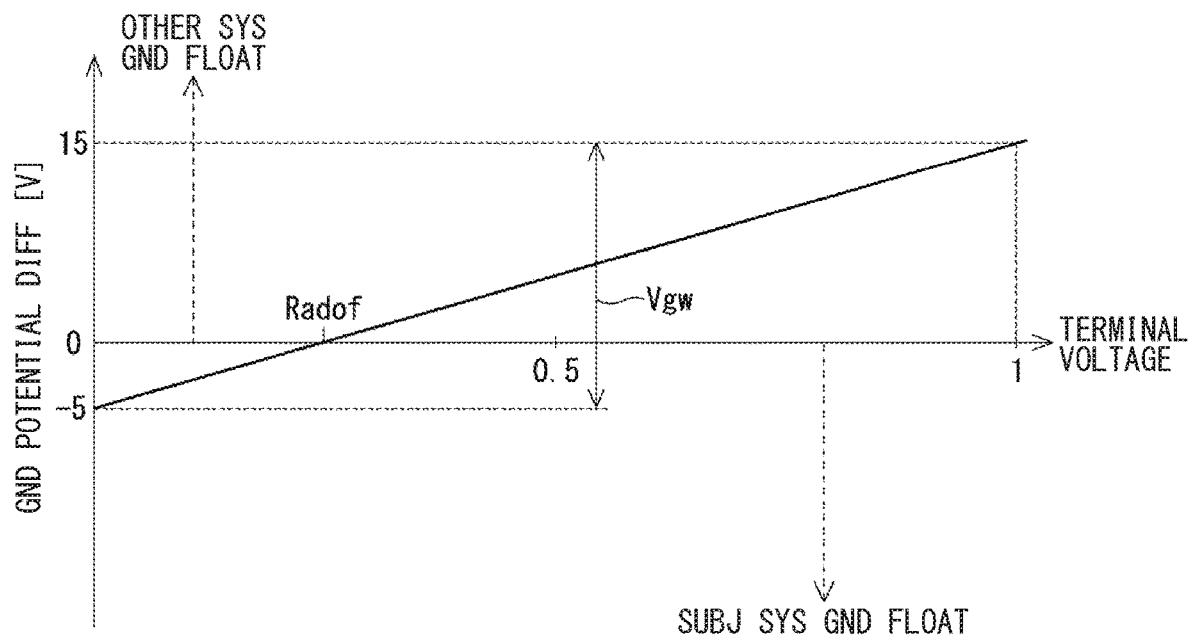
FIG. 7 is an explanatory diagram of a ground potential difference according to the first embodiment.

In the present embodiment, the ground abnormality of the subject system and the other system is detected based on terminal voltages Vd1 and Vd2 of the ADIN input terminals. As shown in FIG. 7, the terminal voltages Vd1 and Vd2 can be converted into a ground potential difference ΔV. In FIG. 7, the horizontal axis represents a value obtained by dividing the terminal voltage Vd1 by MSB, and the vertical axis represents the ground potential difference ΔV. In the drawing, the horizontal axis is simply described as a "terminal voltage." The same applies to FIGS. 8 and 16. In the circuit configuration of FIG. 6, when the ground potential difference ΔV is greater than 0, the other system ground floats with respect to the subject system ground, and when the ground potential difference ΔV is less than 0, the subject system ground floats with respect to the other system ground.

A ground potential difference detection width Vgw can be arbitrarily set by setting a resistance value or the like. Hereinafter, it is an example of a method for setting the resistance value, etc., and the subscripts "1" and "2" related to the system are omitted. In the example of FIG. 7, since a subject system ground floating detection voltage range is −5 [V], and an other system ground floating detection voltage range is 15 [V], the ground potential difference detection width Vgw is 20 [V].

When an ADC conversion value at a potential difference of 0 is designated as an ADC offset value Radof, Radof is represented by an equation (1). Further, the pull-up resistor power source voltage VA is set by an equation (2). Here, it is assumed that the ADC input reference voltage Vrf=5 [V].

$$\text{Radof} = \text{a subject system ground floating detection voltage range}/Vgw = 5/20 = 0.25 \quad (1)$$

$$VA = Vrf \times \text{Radof}/(1-Vfr/Vgw) = 5 \times 0.25/(1-5/20) = 1.667 \text{ [V]} \quad (2)$$

Here, the resistors 171 and 271 are pull-up resistors, the resistors 172 and 272 are pull-down resistors, and a resistance value ru of the pull-up resistor and a resistance value rd of the pull-down resistor are set by equations (3) and (4).

$$ru = r \times (Vrf/Vgw) \quad (3)$$

$$rd = r \times (1 - Vrf/Vgw) \quad (4)$$

Here, r may preferably be set to a value high enough for not causing the characteristics change or a malfunction, based on a prediction of the maximum potential difference that can occur at the time of abnormality, for example, such as ru=25 [kΩ] and rd=75 [kΩ] or the like.

Figure 8:
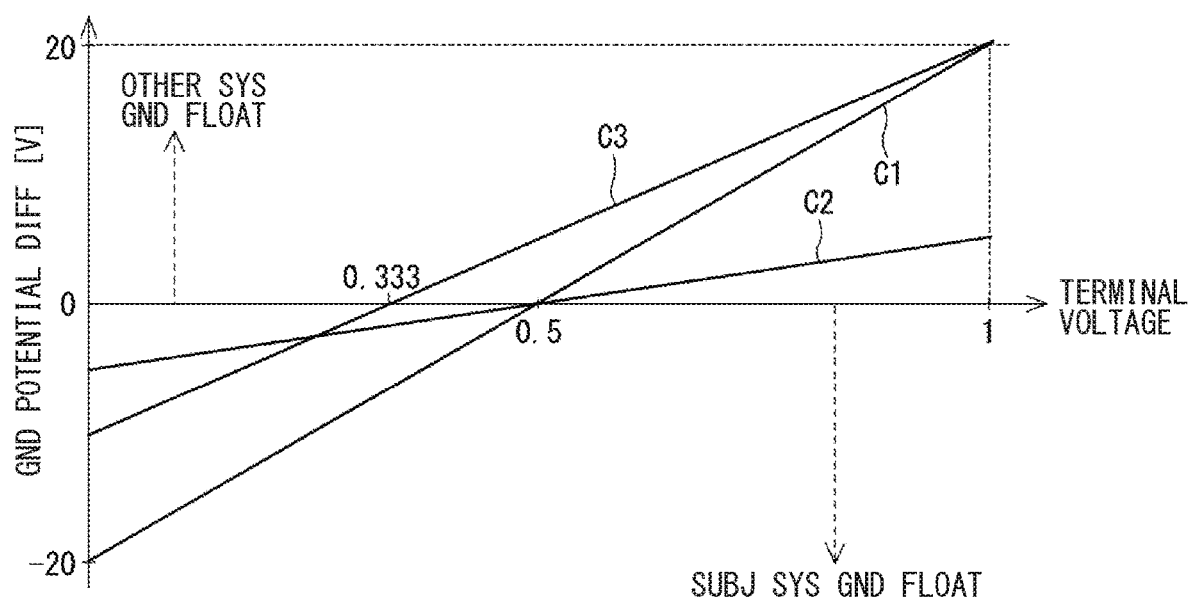
FIG. 8 is another explanatory diagram of the ground potential difference according to the first embodiment.

Further, as shown in FIG. 8, an arbitrary detection characteristic can be created. That is, when the detection range is set as a range of −20 [V] to 20 [V] as indicated by a solid line C1, the values may be set such that Vrf=5 [V], VA=2.875 [V], ru=12.5 [kΩ], rd=87.5 [kΩ] and Radof=0.5.

When the detection range is set as a range of −5 [V] to 5 [V] as indicated by a solid line C2, the values may be set such that Vrf=5 [V], VA=5 [V], ru=50 [kΩ], rd=50 [kΩ], and Radof=0.5.

When the detection range is set as a range of −10 [V] to 20 [V] as indicated by a solid line C3, the values may be set such that Vrf=5 [V], VA=1.998 [V], ru=16.67 [kΩ], rd=83.33 [kΩ] and Radof=0.333. The values shown here are only examples and may be changed in any manner. Here, if the pull-up resistor power source voltage VA is configured to be proportional to the ADC input reference voltage, a circuit with a relatively high accuracy can be designed. The same applies to the fourth embodiment. Hereinafter, a specific example of threshold setting for ground abnormality detection is described with reference to the characteristics represented by the solid line C2.

Figure 9:
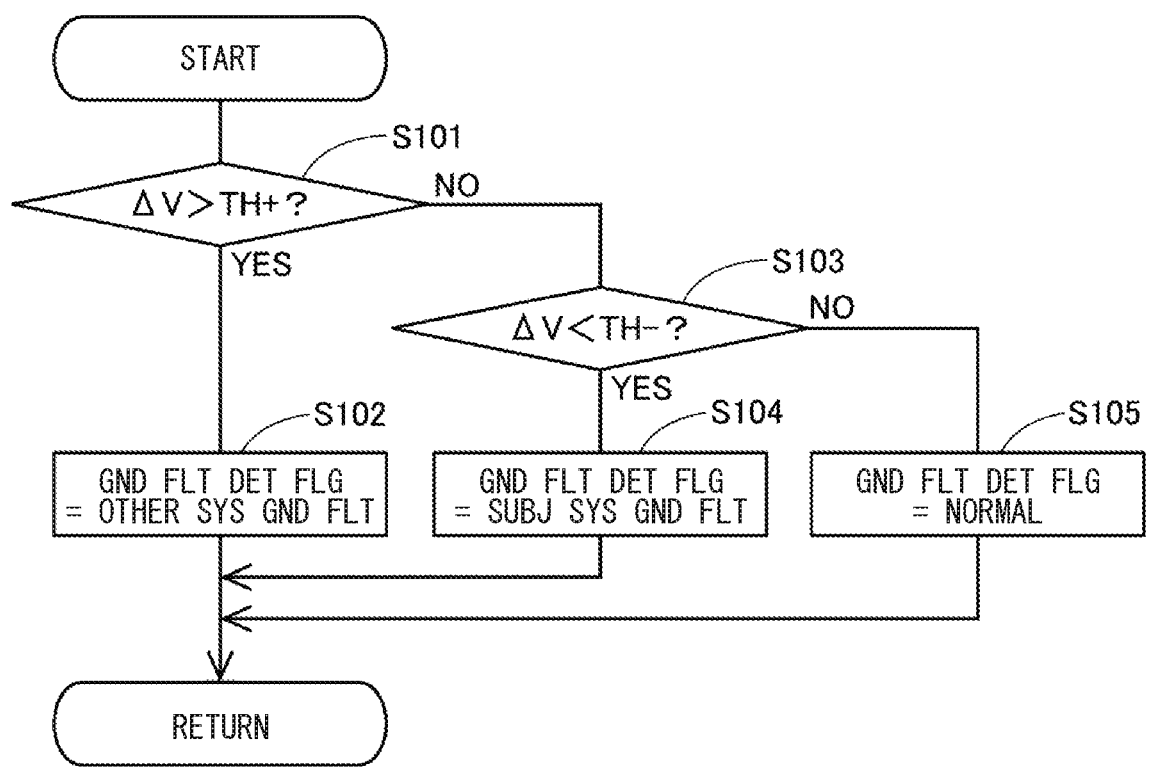
FIG. 9 is a flowchart of a ground abnormality determination process according to the first embodiment.
Figure 10:
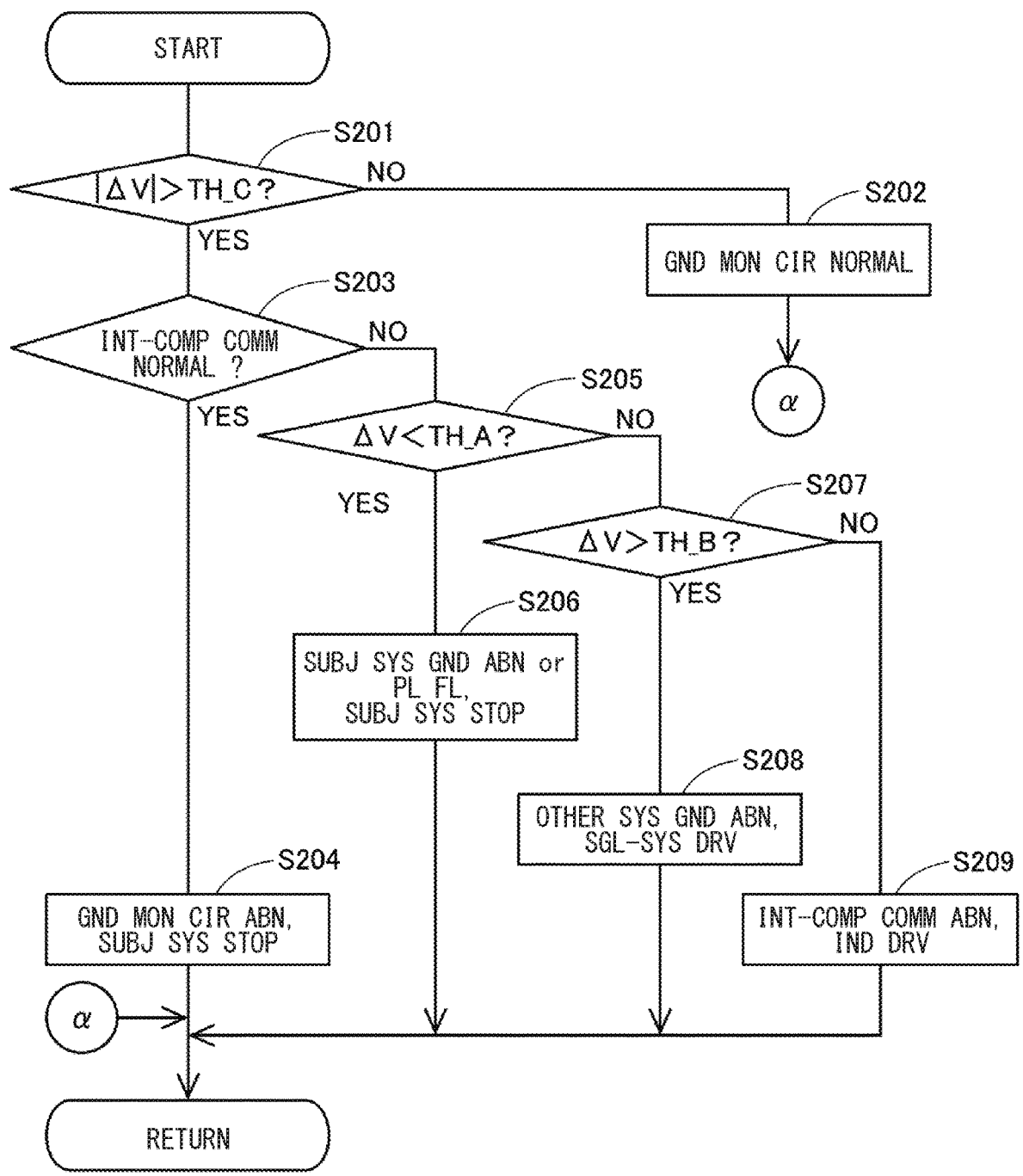
FIG. 10 is a flowchart of an initial monitoring process of the ground monitor circuit according to the first embodiment.

The ground abnormality determination process is described based on the flowchart of FIG. 9. This process is performed in the control circuit units 150 and 250 at a predetermined cycle. Since the processing in the control circuit units 150 and 250 is the same, the processing in the first control circuit unit 150 is described below. The processing in the second control circuit unit 250 may be understood by reading the subject system as the second system L2 and the other system as the first system L1. Hereinafter, "step" may simply be indicated as a symbol S, such as "S101." The same applies to the other steps.

In S101, the abnormality monitor unit 155 determines whether or not the ground potential difference ΔV is greater than a positive abnormality determination threshold TH+. When it is determined that the ground potential difference ΔV is greater than the positive abnormality determination threshold TH+ (S101: YES), the process proceeds to S102, and a ground floating determination flag is set to "other system ground floating." When it is determined that the ground potential difference ΔV is equal to or less than the positive abnormality determination threshold TH+ (S101: NO), the process proceeds to S103.

In S103, the abnormality monitor unit 155 determines whether or not the ground potential difference ΔV is smaller than a negative abnormality determination threshold TH−. When it is determined that the ground potential difference ΔV is smaller than the negative abnormality determination threshold TH− (S103: YES), the process proceeds to S104, and the ground floating determination flag is set to "subject system ground floating." When it is determined that the ground potential difference ΔV is equal to or greater than the negative THb (S103: NO), the process proceeds to S105, and the ground floating determination flag is set to "normal."

The abnormality determination threshold can be set to an arbitrary value greater than an inter-system ground potential difference of normal time. In addition, two threshold values, such as a value that reliably causes communication abnormality (e.g., 3 [V]) and a value that enables normal operation and is greater than the inter-system ground potential difference at normal time (e.g., 0.8 [V]) may be used. Hereinafter, when the ground potential difference ΔV is smaller than the negative abnormality determination threshold or greater than the positive abnormality determination threshold, it is designated that the ground potential difference is outside a normal range, and when the ground potential difference ΔV is equal to or greater than the negative abnormality determination threshold and is equal to or less than the positive abnormality determination threshold, it is designated that "the ground potential difference is within a normal range."

In the present embodiment, an abnormality currently occurring is identified based on the inter-microcomputer communication state, the other system relay monitoring state, and the ground potential difference, and a control mode corresponding to or suitable for the currently-occurring abnormality is selected. The initial monitoring process of the ground monitor circuit is described based on the flowchart of FIG. 10. This process is performed when the system is started, such as when the start switch of the vehicle is turned on or the like. Hereinafter, a monitoring process that is performed before starting the drive control of the motor 80 at the time of system startup is designated as an initial check. At the time of initial check, almost no current flows, and stable determination is performable. In addition, abnormalities of the ground monitor circuit and the relay monitor circuit may be a sunken failure while the motor is driven. That means, such abnormalities have to be determined by the initial check. The subject system is assumed to be normal except for the configuration related to the other system monitoring. The following embodiments have the same assumption.

In S201, the abnormality monitor unit 155 determines whether or not an absolute value of the ground potential difference ΔV is greater than an abnormality determination threshold TH_C. The abnormality determination threshold TH_C is set to a value that reliably causes communication abnormality (e.g., 3 [V]). When it is determined that the absolute value of the ground potential difference ΔV is equal to or less than the abnormality determination threshold TH_C (S201: NO), the process proceeds to S202, where it is determined that the ground monitor circuit 161 is normal. When it is determined that the absolute value of the ground potential difference ΔV is greater than the abnormality determination threshold TH_C (S201: YES), the process proceeds to S203.

In S203, the abnormality monitor unit 155 determines whether or not the inter-microcomputer communication is normal. If it is determined that the inter-microcomputer communication is not normal (S203: NO), the process proceeds to S204, and the abnormality of the ground monitor circuit 161 is identified. By the initial check, since the power supply current hardly flows, when the inter-microcomputer communication is normal and the ground potential difference ΔV is large, it is determined that the ground monitor circuit 161 is abnormal, and the ground monitor circuit abnormality is stored as an abnormality history in a storage or the like (not shown in the drawing). The drive control unit 151 stops the drive control of the motor 80 using the subject system. When the control using the subject system is stopped, if the second system L2 which is the other system is normal, the motor 80 is driven by single-system drive, i.e., by the energization control of the second control circuit unit 250 to the second motor winding 280.

In the single-system drive, one of the two systems may simply be stopped for the control by the other system (i.e., an independent drive like control may be performed), or the gain and rating may be increased to compensate for the output of the stopped system.

Hereinafter, stopping the control using the subject system is referred to as a "subject system stop." When it is determined that the inter-microcomputer communication is not normal (S203: NO), the process proceeds to S205.

In S205, the abnormality monitor unit 155 determines whether or not the ground potential difference $\Delta V$ is smaller than an abnormality determination threshold TH_A. The abnormality determination threshold TH_A is a negative value that has a greater absolute value than the inter-system ground potential difference of normal time and a smaller absolute value than the abnormality determination threshold TH_C. When it is determined that the ground potential difference $\Delta V$ is smaller than the abnormality determination threshold TH_A (S205: YES), the process proceeds to S206, and it is determined that the subject system ground abnormality or a plurality of failures have been caused. The drive control unit 151 stops the subject system (i.e., performs the "subject system stop"). When it is determined that the ground potential difference $\Delta V$ is equal to or greater than the abnormality determination threshold TH_A (S205: NO), the process proceeds to S207.

In S207, the abnormality monitor unit 155 determines whether or not the ground potential difference $\Delta V$ is greater than an abnormality determination threshold TH_B. The abnormality determination threshold TH_B is a positive value that is greater than the inter-system ground potential difference of normal time and is smaller than the abnormality determination threshold TH_C. Further, the abnormality determination thresholds TH_A and TH_B may have the same absolute value or may have different absolute values. When it is determined that the ground potential difference $\Delta V$ is greater than the abnormality determination threshold TH_B (S207: YES), the process proceeds to S208, and it is determined that the other system ground abnormality has been caused. The drive control unit 151 drives the motor 80 by the single-system drive of the subject system. When it is determined that the ground potential difference $\Delta V$ is equal to or less than the abnormality determination threshold TH_B (S207: NO), the process proceeds to S209.

In S209, the abnormality monitor unit 155 determines that the inter-microcomputer communication abnormality has been caused. The drive control unit 151 controls the drive of the motor 80 by the independent drive that does not use information of the second system L2.

Figure 11:
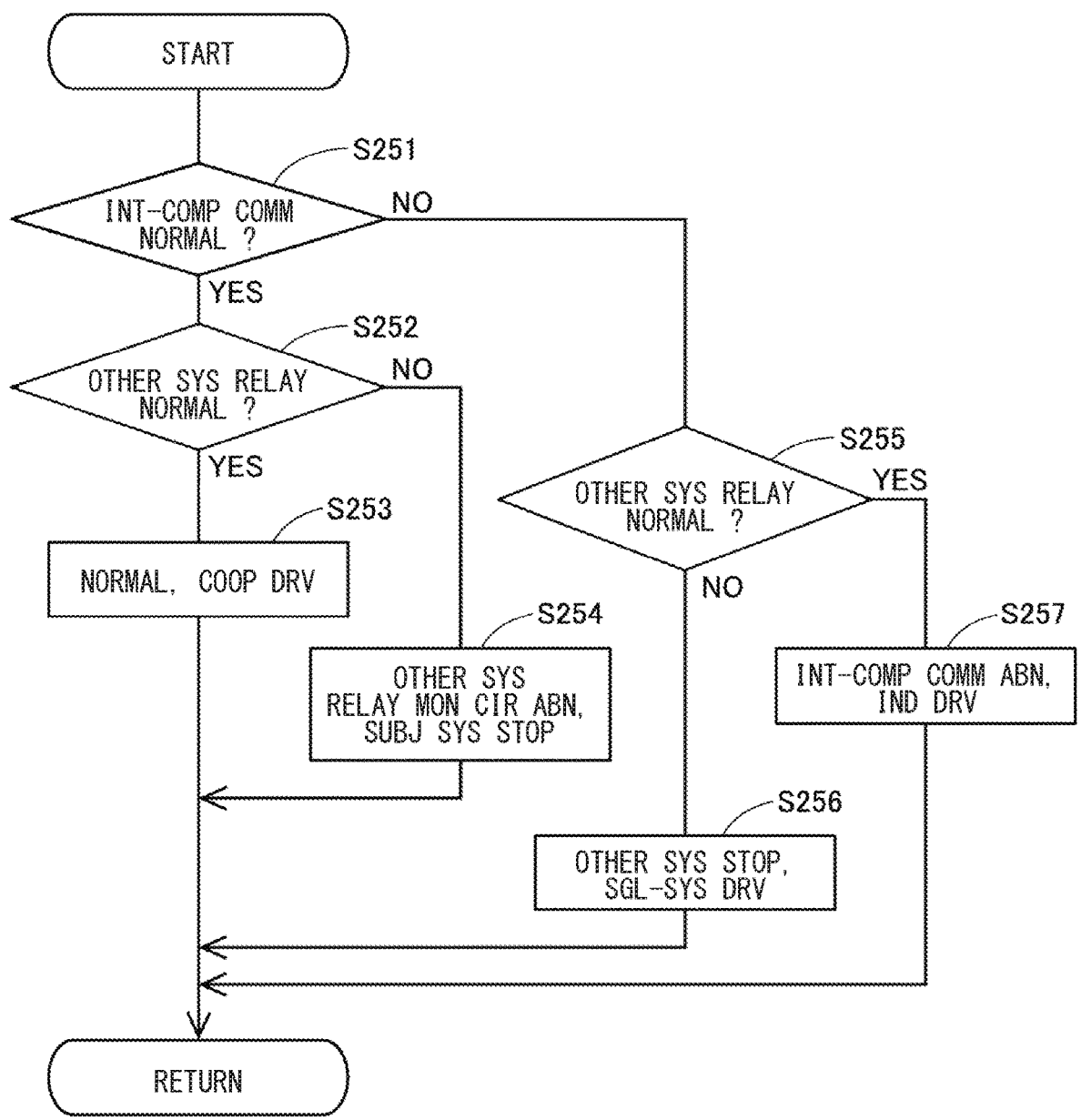
FIG. 11 is a flowchart of the initial monitoring process when the ground monitor circuit is normal according to the first embodiment.

The initial monitoring process when the ground monitor circuit is normal is described with reference to the flowchart of FIG. 11. This process is performed by the initial check before starting the drive control of the motor 80 when the ground monitor circuit is normal by the initial check.

In S251, the abnormality monitor unit 155 determines whether or not the inter-microcomputer communication is normal. When it is determined that the inter-microcomputer communication is normal (S251: YES), the process proceeds to S252. When it is determined that the inter-microcomputer communication is abnormal (S251: NO), the process proceeds to S255.

In S252, the abnormality monitor unit 155 determines whether or not the other system relay is turned on at the timing of when the other system relay is (i.e., should be) turned on based on the other system relay information. Hereinafter, the on state of the other system relay is normally detected at the timing of when the other system relay is turned on is designated as "other system relay normal", and the off state of the other system relay detected at such timing, i.e., even at the timing of when the other system relay should be detected as being turned on, is designated as "other system relay abnormality." When it is determined that the other system relay is normal (S252: YES), the process proceeds to S253, and when it is determined that the other system relay is abnormal (S252: NO), the process proceeds to S254.

In S253, the abnormality monitor unit 155 determines that the initial check is normal. Further, the drive control unit 151 controls the drive of the motor 80 by a cooperative drive by two systems. In the cooperative drive, the control circuit units 150 and 250 share required information by the inter-microcomputer communication, and drive the motor 80 using information of the subject system and information of the other system.

In S254, since the inter-microcomputer communication is normal and the other system relay is abnormal, the abnormality monitor unit 155 determines that the other system relay monitor circuit 139 is abnormal and the ground monitor circuit abnormality is stored as an abnormality history in a storage or the like, which is not shown in the drawing. During such determination, if the inter-microcomputer communication has abnormality, there may be a possibility that correct abnormality determination is not performable. Therefore, the drive control unit 151 stops the drive control of the motor 80 using the subject system.

In S255, i.e., to which the process proceeds when the inter-microcomputer communication is determined as abnormal (S251: NO), the abnormality monitor unit 155 determines whether the other system relay is normal based on the other system relay information. When it is determined that the other system relay is abnormal (S255: NO), the process proceeds to S256, and it is determined that the other system is stopped. The drive control unit 151 controls the drive of the motor 80 by the single-system drive of the subject system. When it is determined that the other system relay is normal (S255: YES), the process proceeds to S257, and it is determined that the inter-microcomputer communication is abnormal. The drive control unit 151 controls the drive of the motor 80 by the independent drive.

Figure 12:
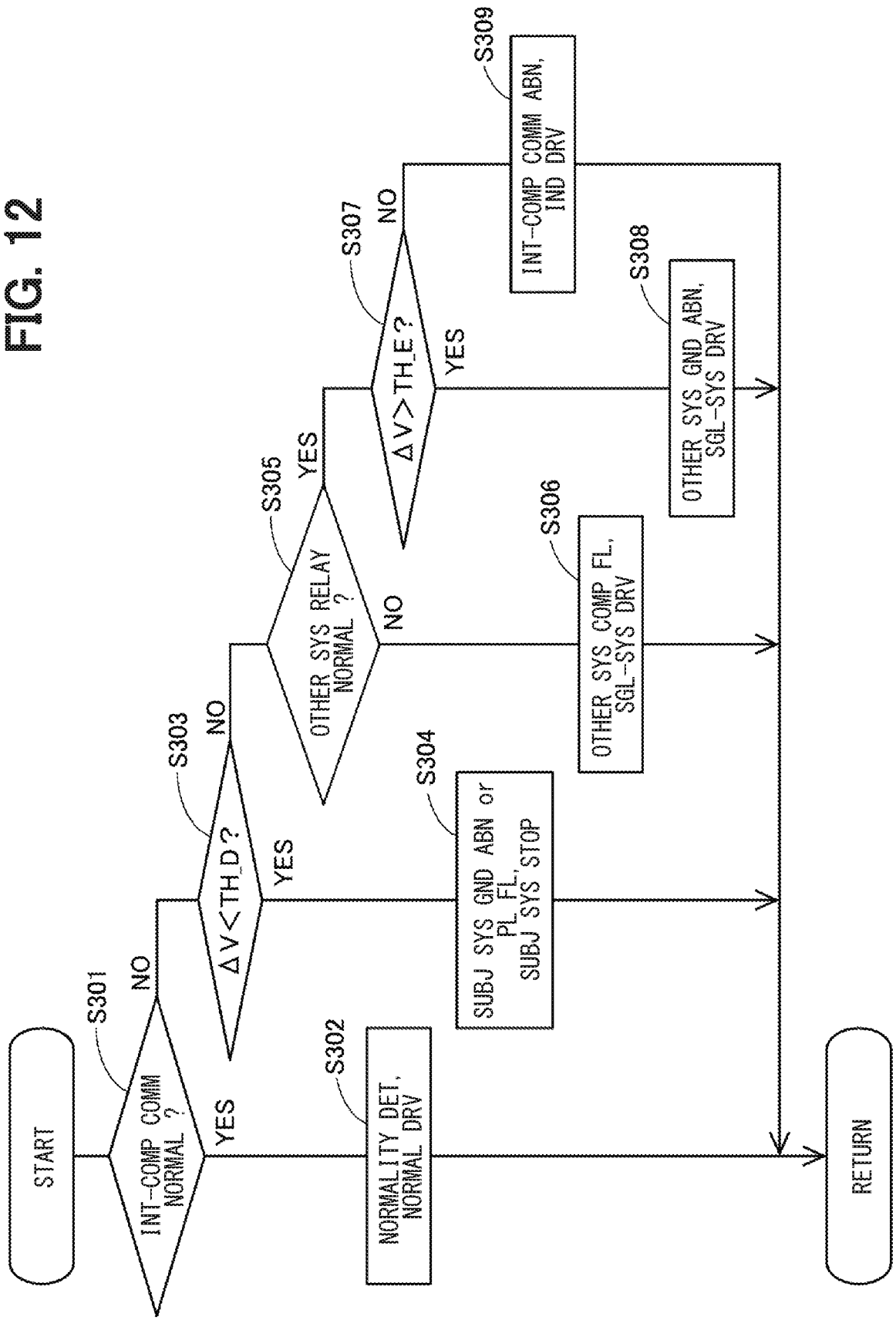
FIG. 12 is a flowchart of an in-drive monitoring process according to the first embodiment.

The in-drive monitoring process during the drive is described based on the flowchart of FIG. 12. This process is performed in a predetermined cycle after the initial check is complete. In S301, the abnormality monitor unit 155 determines whether or not the inter-microcomputer communication is normal. When it is determined that the inter-microcomputer communication is normal (S301: YES), the process proceeds to S302 to determine normality. Also, in this step, since the inter-microcomputer communication is normal, the state of the other system is determined as is based on the information obtained by the inter-microcomputer communication, which leads to the single-system control of the subject system by the drive control unit 151 when the other system drive state is determined as stopped, or leads to the cooperative drive for the drive of the motor when the other system is normal. In the following, when the inter-microcomputer communication and the drive system (i.e., drive-related components) of the subject system are normal, operation according to the information obtained by the inter-microcomputer communication, i.e., (i) the single-system drive of the subject system is performed when the other system drive state is determined as stopped and (ii) drive control of the motor 80 is performed as a cooperative drive when the other system is normal, is referred to as a "normal drive."

Note that the drive system means various parts that constitute the path of the electric current supplied to the motor, such as the inverter unit 120 and the motor winding 180. Further, the "other system normal" means a state in which the drive system of the other system is normal and the cooperative drive is performable. When it is determined that the inter-microcomputer communication is abnormal (S301: NO), the process proceeds to S303.

In S303, the abnormality monitor unit 155 determines whether or not the ground potential difference ΔV is smaller than an abnormality determination threshold TH_D. The abnormality determination threshold TH_D is an arbitrary negative value that has an absolute value greater than the inter-system ground potential difference of normal time which is usable for a determination of the ground floating. The absolute value of the abnormality determination threshold TH_D may be equal to or different from the absolute values of the abnormality determination thresholds TH_A, TH_B, and TH_C. When it is determined that the ground potential difference ΔV is smaller than the abnormality determination threshold TH_D (S303: YES), the process proceeds to S304, and it is determined that the subject system ground abnormality or a plurality of failures have been caused. The drive control unit 151 stops the subject system (i.e., performs the "subject system stop"). When it is determined that the ground potential difference ΔV is equal to or greater than the abnormality determination threshold TH_D (S303: NO), the process proceeds to S305.

In S305, the abnormality monitor unit 155 determines whether the other system relay is normal based on the other system relay information. When it is determined that the other system relay is abnormal (S305: NO), the process proceeds to S306, and it is determined that the other system microcomputer has failed. Since it is confirmed by the initial check that the other system relay monitor circuit is normal, the situation is determined here that the other system microcomputer is faulty. The drive control unit 151 continues the drive control of the motor 80 by the single-system drive of the subject system. When it is determined that the other system relay is normal (S305: YES), the process proceeds to S307.

In S307, the abnormality monitor unit 155 determines whether or not the ground potential difference ΔV is greater than an abnormality determination threshold TH_E. The abnormality determination threshold TH_E is an arbitrary positive value that has a greater absolute value than the normal system ground potential difference, which is usable for a determination of the ground floating. The absolute value of the abnormality determination threshold TH_E may be equal to or different from the absolute values of the abnormality determination thresholds TH_A, TH_B, TH_C, and TH_D. When it is determined that the ground potential difference ΔV is greater than the abnormality determination threshold TH_E (S307: YES), the process proceeds to S308 and it is determined that the other system ground abnormality has been caused. The drive control unit 151 continues the drive control of the motor 80 by the single-system drive of the subject system. When it is determined that the ground potential difference ΔV is equal to or less than the abnormality determination threshold TH_E (S307: NO), the process proceeds to S309, and it is determined that abnormality has been caused in the inter-microcomputer communication.

The drive control unit 151 continues the drive control of the motor 80 by the independent drive.

The first control circuit unit 150 is connected to the first ground GND1 that is separate from the second ground GND2 to which the second control circuit unit 250 is connected. That is, in the present embodiment, the ground is separately provided for each system. When the ground is separate for each system, if a ground abnormality occurs in one system, the other system relay may falsely be observed as being turned on, and the other system monitoring based on the other system relay information may be not properly performable.

In the present embodiment, by having the first ground monitor circuit 161, the first control circuit unit 150 can detect the ground abnormality of the subject system and the other system by using a single piece of the terminal voltage Vd1. Similarly, by having the second ground monitor circuit 261, the second control circuit unit 250 can detect the ground abnormality of the subject system and the other system by using a single piece of the terminal voltage Vd2. In addition, by monitoring the inter-microcomputer communication, other system relays, and the ground potential difference ΔV, it is possible to appropriately identify the abnormality that has been caused, thereby enabling a selection of an appropriate control mode according to the abnormality that has been caused.

As described above, the ECU 10 includes the plurality of control circuit units 150 and 250 and the ground monitor circuits 161 and 261. The control circuit units 150 and 250 are connected to the circuit power sources 137 and 237 and the grounds GND1 and GND2 which are separate, respectively.

A combination of components provided corresponding to the control circuit units 150 and 250, the circuit power sources 137 and 237, and the grounds GND1 and GND2 is defined as a system. The ground monitor circuits 161 and 261 have the resistors 171 and 271 connected at one end to the voltage source, the resistors 173 and 273 connected at one end to the input terminals of the corresponding control circuit units 150 and 250, and the capacitors 174 and 274 connected at one end to a position between the resistor 173 the input terminals and at the other end connected to the ground of the subject system. At least one of the one end of the resistors 171 and 271, the other end of the resistors 171 and 271, and the other end of the resistors 173 and 273 is connected to the subject system, and at least one of the rest is connected to the other system. The ground monitor circuits 161 and 261 are provided for the control circuit units 150 and 250, respectively.

In the present embodiment, the ground monitor circuit 161 includes the resistor 172, which has one end connected to a connection point between the resistor 171 and the resistor 173 and the other end connected to the ground. The ground monitor circuit 261 includes the resistor 272, which has one end connected to a connection point between the resistor 271 and the resistor 273 and the other end connected to the ground. Also, one end of each of the resistors 171 and 271 is connected to a pull-up power supply of the subject system, and the other end is connected to the ground of the other system via the resistors 172 and 272.

In the present embodiment, the pull-up resistor power source is provided separately from the circuit power sources 137 and 237. As a result, the pull-up resistor power source voltage VA can be arbitrarily set separately from the circuit power source voltage, thereby enabling a setting of any detection characteristic related to the ground abnormality.

The control circuit units 150 and 250 monitor the ground abnormality of the other system based on the terminal voltages Vd1 and Vd2 of the ADIN input terminal that is an input terminal to which the resistors 173 and 273 are connected. In the present embodiment, the ground abnormality of the subject system and the other system is monitored based on the terminal voltages Vd1 and Vd2. By providing the ground monitor circuits 161 and 261, the ground abnormality can be detected appropriately. In addition, since the resistors 173 and 273 and the capacitors 174 and 274 form a filter circuit, even when applied to a system in which a large electric current is applied such as the electric power steering apparatus 8, the noise of the terminal voltage is reducible, thereby enabling an appropriate detection of the ground abnormality of the other system.

The control circuit units 150 and 250 calculate the ground potential difference $\Delta V$ that is a potential difference between the ground of the subject system and the ground of the other system based on the terminal voltages Vd1 and Vd2, and when the ground potential difference $\Delta V$ is greater than the positive abnormality determination threshold TH1+, it is determined that one of the ground of the subject system or the ground of the other system is abnormal, and when the ground potential difference $\Delta V$ is smaller than the negative abnormality determination threshold TH1−, it is determined that the other one of the above is abnormal. In the present embodiment, when the ground potential difference $\Delta V$ is greater than the positive abnormality determination threshold TH1+, it is determined that the ground abnormality of the other system, and when the ground potential difference $\Delta V$ is smaller than the negative abnormality determination threshold TH1−, it is determined that the ground abnormality of the subject system. In such manner, the first control circuit unit 150 can appropriately determine the ground abnormality of the subject system and of the other system based on one piece of information, i.e., by the terminal voltage Vd1. Similarly, the second control circuit unit 250 can appropriately determine the ground abnormality of the subject system and of the other system based on one piece of information, i.e., by the terminal voltage Vd2. Note that the absolute values of the positive abnormality determination threshold and the negative abnormality determination threshold may be the same value or different values.

Each of the systems is provided with the power supply relays 122 and 222 that are turned off when abnormality occurs in the subject system, and the other system relay monitor circuits 139 and 239 that obtain the state of the power supply relays of the other system. The control circuit units 150 and 250 are communicable with each other, and determine an abnormal state according to the ground potential difference $\Delta V$, the communication state between the control circuit units 150 and 250, and the state of the other system relay, thereby changing the control according to the determined state.

In the present embodiment, the other system relay is monitored to monitor whether or not the other system is being driven. Here, when the other system stops the drive due to an abnormality such as the ground floating or the ground disconnection, the other system relay may falsely be observed as being turned on from the subject system. In the present embodiment, since the ground abnormality is monitored, it is possible to appropriately monitor the drive state of the other system without falsely determining the state of the other system relay.

The control circuit units 150 and 250 perform a normal-time control by using the information shared by the communication between the control circuit units 150 and 250 at normal time. The normal-time control of the present embodiment is the cooperative drive. In the cooperative drive, at least a part of the information, e.g., an instruction value, a limit value, a current detection value, and the like related to the current control are shared and used in a plurality of systems. When the communication between the control circuit units 150 and 250 is not normal, if the ground potential difference $\Delta V$ is outside the normal range, it is determined that the ground of one system is abnormal, and control is performed by the other system. When the communication between the control circuit units 150 and 250 is not normal, when the ground potential difference $\Delta V$ is within the normal range and the other system relay is normal, it is determined that the communication is abnormal, and the independent control that does not use the information of the other system is performed. In the independent control, control is performed by using a plurality of systems without using the information of the other system. When the communication between the control circuit units 150 and 250 is not normal, if the ground potential difference is within the normal range and the other system relay is abnormal, it is determined that the control circuit unit of the other system is abnormal, and control is performed by the subject system. In such manner, by selecting the control mode according to the abnormal state, the control can be continued even when a part of the systems suffers from abnormality.

When the communication between the control circuit units 150 and 250 is normal and the ground potential difference $\Delta V$ is outside the normal range, the control circuit units 150 and 250 determine that the ground monitor circuits 161 and 261 are abnormal. In the present embodiment, the control circuit units 150 and 250 perform abnormality determination of the ground monitor circuits 161 and 261 before starting control of the motor 80 that is a control object. In such manner, the abnormality of the ground monitor circuits 161 and 261 can be appropriately determined.

When the communication between the control circuit units 150 and 250 is normal and the ground potential difference $\Delta V$ is within the normal range and an abnormality of the other system relay is detected, the control circuit units 150 and 250 determine that the other system relay monitor circuits 139 and 239 are abnormal. Here, "the other system relay is abnormal" is a state where it is detected that the other system relay is not turned on at the timing of when the other system relay is (i.e., should be) turned on. In the present embodiment, the control circuit unit 150 determines abnormality of the other system relay monitor circuits 139 and 239 before starting the control of the motor 80 that is the control object. In such manner, the abnormality of the configuration which is related to the monitoring of the other system relay can be appropriately determined.

The control circuit units 150 and 250 control the drive of the motor 80. Further, the electric power steering apparatus 8 includes the ECU 10 and the motor 80. Since the control circuit units 150 and 250 have the above-described configuration, the motor 80 can be appropriately driven continuously even when the abnormality occurs in a part of the configuration related to the drive control of the motor 80. In addition, since the ECU 10 and the control circuit units 150 and 250 are applied to the electric power steering apparatus 8, the steering operation is appropriately assisted continuously even when the abnormality occurs in a part of the configuration related to the drive control of the motor 80.

Second Embodiment

Figure 13:
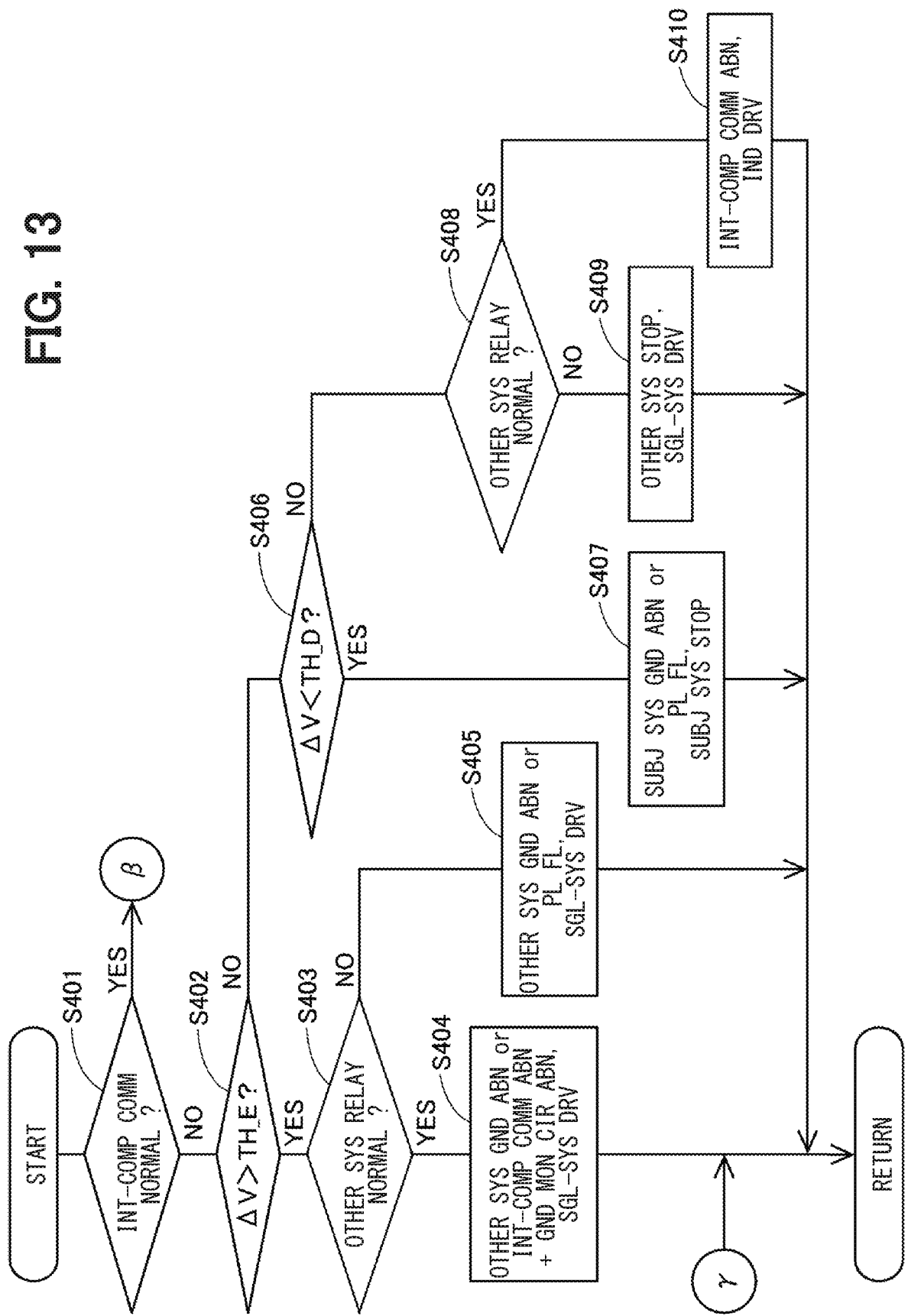
FIG. 13 is a flowchart of the in-drive monitoring process according to a second embodiment.
Figure 14:
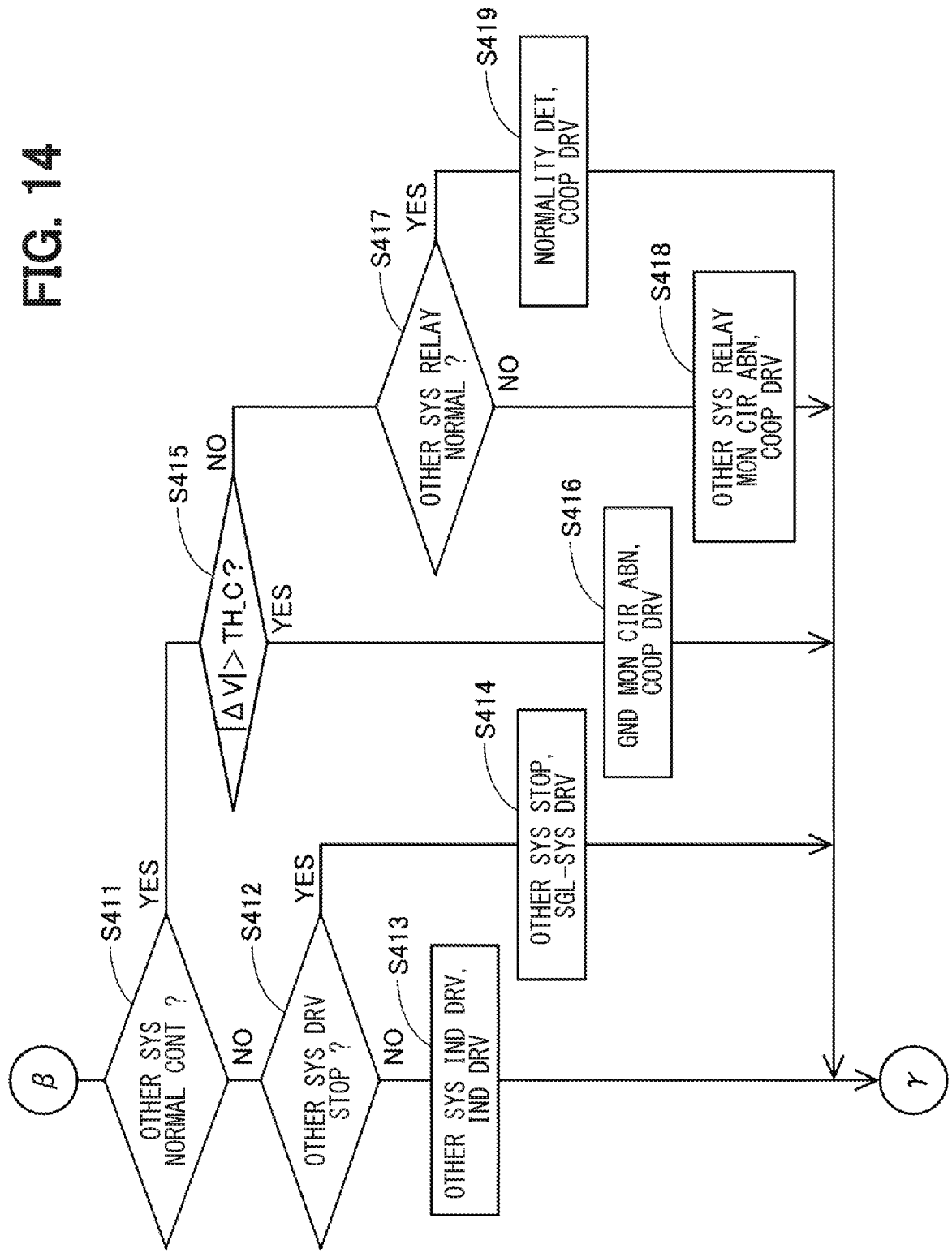
FIG. 14 is another flowchart of the in-drive monitoring process according to the second embodiment.

The second embodiment is shown in FIG. 13 and FIG. 14. In the present embodiment, the in-drive monitoring process is different from the one in the above embodiment, and the difference therefrom is mainly discussed below. The in-drive monitoring process of the present embodiment is described based on the flowcharts of FIGS. 13 and 14.

As shown in FIG. 13, the abnormality monitor unit 155 determines in S401 whether or not the inter-microcomputer communication is normal. When it is determined that the inter-microcomputer communication is normal (S401: YES), the process proceeds to S411 in FIG. 14. When it is determined that the inter-microcomputer communication is not normal (S401: NO), the process proceeds to S402.

In S402, the abnormality monitor unit 155 determines whether or not the ground potential difference ΔV is greater than the abnormality determination threshold TH_E that is a positive value. When it is determined that the ground potential difference ΔV is equal to or less than the abnormality determination threshold TH_E (S402: NO), the process proceeds to S406. When it is determined that the ground potential difference ΔV is greater than the abnormality determination threshold TH_E (S402: YES), the process proceeds to S403.

In S403, the abnormality monitor unit 155 determines whether or not the other system relay information is normal. When it is determined that the other system relay information is normal (S403: YES), the process proceeds to S404, and when it is determined that the other system relay information is abnormal (S403: NO), the process proceeds to S405.

In S404, the abnormality monitor unit 155 determines that (i) the other system ground abnormality is being caused, or (ii) an inter-microcomputer communication abnormality and a ground monitor circuit abnormality are being caused. The drive control unit 151 continues the drive control of the motor 80 by the single-system drive of the subject system. In S405, the abnormality monitor unit 155 determines that either one of (i) the other system ground abnormality or (ii) a plurality of failures is being caused. The drive control unit 151 continues the drive control of the motor 80 by the single-system drive of the subject system. Note that, since both of S404 and S405 are the single-system drive for performing the same process, the determination step in S403 may be omissible.

In S406, to which the process proceeds when the ground potential difference ΔV is determined to be equal to or less than the abnormality determination threshold TH_E (S402: NO), the abnormality monitor unit 155 determines whether the ground potential difference ΔV is smaller than the abnormality determination threshold TH_D that is a negative value. When it is determined that the ground potential difference ΔV is equal to or greater than the abnormality determination threshold TH_D (S406: NO), the process proceeds to S408. When it is determined that the ground potential difference ΔV is smaller than the abnormality determination threshold TH_D (S406: YES), the process proceeds to S407, and it is determined that (i) the subject system ground abnormality is being caused or (ii) a plurality of failures are being caused. The drive control unit 151 stops the subject system (i.e., performs the "subject system stop").

In S408, the abnormality monitor unit 155 determines whether or not the other system relay is normal. When it is determined that the other system relay is abnormal (S408: NO), the process proceeds to S409, and when it is determined that the other system relay is normal (S408: YES), the process proceeds to S410.

In S409, the abnormality monitor unit 155 determines that the other system is stopped, and the drive control unit 151 continues the drive control of the motor 80 by the single-system drive of the subject system. In S410, the abnormality monitor unit 155 determines that the inter-microcomputer communication is abnormal, and the drive control unit 151 controls the drive of the motor 80 by the independent drive.

As shown in FIG. 14, in S411, to which the process proceeds when the inter-microcomputer communication is determined to be normal (S401: YES), the abnormality monitor unit 155 determines the other system based on the information obtained by the inter-microcomputer communication, regarding whether it is in a normal control. When it is determined that the other system is in a normal control (S411: YES), the process proceeds to S415. When it is determined that the other system is not in a normal control (S411: NO), the process proceeds to S412.

In S412, the abnormality monitor unit 155 determines whether or not the drive of the other system is stopped based on the information obtained by the inter-microcomputer communication. When it is determined that the drive of the other system is not stopped (S412: NO), the process proceeds to S413, and when it is determined that the drive of the other system is stopped (S412: YES), the process proceeds to S414.

In S413, the abnormality monitor unit 155 determines that the other system is in the independently drive, and the drive control unit 151 controls the drive of the motor 80 by the independent drive. In S414, the abnormality monitor unit 155 determines that the other system is stopped, and the drive control unit 151 continues the drive control of the motor 80 by the single-system drive of the subject system.

In S415, to which the process proceeds when the other system is determined to be in a normal control (S411: YES), the abnormality monitor unit 155 determines whether or not the absolute value of the ground potential difference ΔV is greater than the abnormality determination threshold TH_C. When it is determined that the absolute value of the ground potential difference ΔV is greater than the abnormality determination threshold TH_C (S415: YES), the process proceeds to S416.

In S416, the ground monitor circuit abnormality is stored as an abnormality history in a storage (not shown) or the like, and the drive control unit 151 performs the drive control of the motor 80 by the cooperative drive. When it is determined that the absolute value of the ground potential difference ΔV is equal to or less than the abnormality determination threshold TH_C (S415: NO), the process proceeds to S417.

In S417, the abnormality monitor unit 155 determines whether or not the other system relay is normal. When it is determined that the other system relay is abnormal (S417: NO), the process proceeds to S418. In S418, since the inter-microcomputer communication is normal, the abnormality monitor unit 155 determines that the other system relay monitor circuit 139 is abnormal. The drive control unit 151 stores a subject/other system relay monitor circuit abnormality as an abnormality history in a storage (not shown) or the like, and the drive control unit 151 performs the drive control of the motor 80 by the cooperative drive. When it is determined that the other system relay information is normal (S417: YES), the process proceeds to S419, and the normality is determined therein. The drive control unit 151 controls the drive of the motor 80 by the cooperative drive.

In the present embodiment, during the motor drive after the initial check, when the ground monitor circuit abnormality is detected in S416 and when the other system relay monitor circuit abnormality is detected in S418, the cooperative drive is continued, since the configuration related to the drive control of the motor 80 is normal even though the detection circuit abnormality is being caused. On the other hand, as described in the first embodiment, when a ground monitor circuit abnormality or the other system relay monitor circuit abnormality is detected by the initial check, the other system monitoring cannot be performable, thereby the subject system is stopped. That is, in the present embodiment, a different process is performed depending on whether the abnormality detection timing of the ground monitor circuit 161 or the other system relay monitor circuit 139 is during the initial check or during the drive.

In the present embodiment, since the abnormality of the ground monitor circuits 161 and 261 and the abnormality of the other system relay monitor circuits 139 and 239 are monitored even during the motor drive control after the initial check, the abnormal state (i.e., the state of abnormality) can more specifically be identified/determined. Further, the same advantages as those of the above embodiment are achievable in the present embodiment.

Third Embodiment

Figure 15:
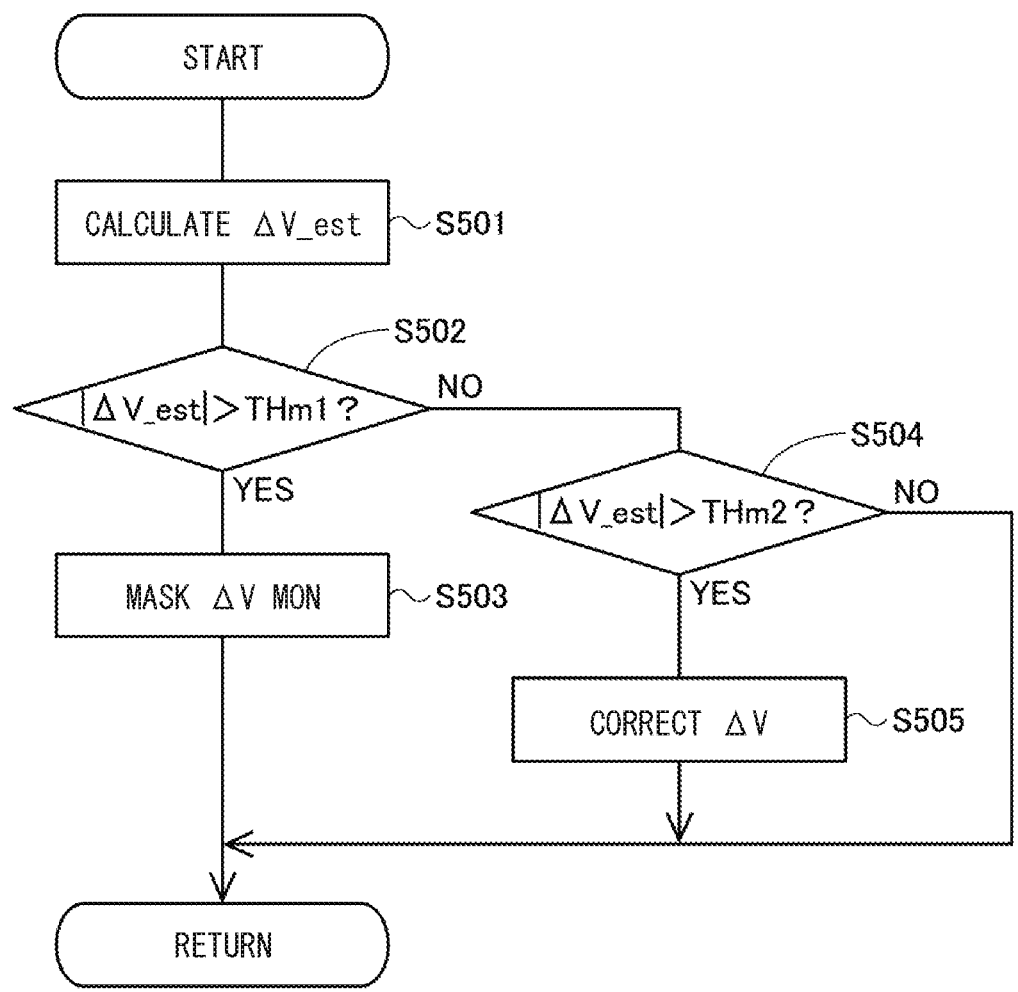
FIG. 15 is a flowchart of a monitoring mask process according to a third embodiment.

The third embodiment is shown in FIG. 15. In the above embodiments, abnormality monitoring using the ground potential difference ΔV is performed. Here, a temporary ground potential difference may occur between the systems due to the fluctuation of the vehicle power supply voltage or due to the influence of the wiring resistance, for example. Therefore, in the present embodiment, a monitoring mask process is performed in order to prevent deterioration in monitoring function due to erroneous determination, i.e., falsely determining the temporary ground voltage fluctuation due to external factors as the ground abnormality. The monitoring mask process can be combined with any of the above embodiments.

The monitoring mask process is described based on the flowchart of FIG. 15. In S501, the abnormality monitor unit 155 calculates an estimated ground potential difference ΔV_est. A ground voltage fluctuation Vf1 of the first system L1 is calculated from a power supply current lb1 of the first system L1 and a ground wiring resistance R_gnd1 (see an equation (5)).

A ground voltage fluctuation Vf2 of the second system L2 is calculated from a power supply current lb2 and a ground wiring resistance R_gnd2 of the second system L2 (see an equation (6)). Further, the estimated ground potential difference ΔV_est is calculated from an equation (7).

$$Vf1 = lb1 \times R\_gnd1 \quad (5)$$

$$Vf2 = lb2 \times R\_gnd2 \quad (6)$$

$$\Delta V\_est = Vf1 - Vf2 \quad (7)$$

The ground voltage fluctuations Vf1 and Vf2 may be calculated by the control circuit units 150 and 250 of each system and then shared by inter-microcomputer communication, or the power supply currents lb1 and lb2 may be shared by the inter-microcomputer communication and the control circuit units 150 and 250 may respectively calculate the ground voltage fluctuations Vf1 and Vf2. Further, in place of the power supply currents lb1 and lb2, information (e.g., inverter power or power supply voltage) that enables calculation of the ground voltage fluctuations Vf1 and Vf2 may be shared by the inter-microcomputer communication. Furthermore, a circuit capable of detecting the power supply currents lb1 and lb2 of the subject system and the other system may be provided in each system. Here, the estimated ground potential difference ΔV_est is an estimated value obtained by estimating a potential difference caused by an external factor or the like, and the ground potential difference ΔV can be regarded as a detection value corresponding to the terminal voltage. Further, the estimated ground potential difference ΔV_est can also be regarded as an estimated value obtained by estimating the ground potential difference from parameters other than the terminal voltage.

In S502, the abnormality monitor unit 155 determines whether or not the absolute value of the estimated ground potential difference ΔV_est is greater than a monitoring mask determination value THm1. The monitoring mask determination value THm1 is such a value that does not practically allow the inter-microcomputer communication to be performed, and is set to a value (i) greater than the second abnormality determination threshold and (ii) smaller than the first abnormality determination threshold of the second embodiment, for example. When it is determined that the absolute value of the estimated ground potential difference ΔV_est is equal to or less than the monitoring mask determination value THm1 (S502: NO), the process proceeds to S504. If a negative determination is made in S502, the monitoring mask using the ground potential difference ΔV is not performed. In other words, abnormality monitoring using the ground potential difference ΔV is performed. When it is determined that the absolute value of the estimated ground potential difference ΔV_est is greater than the monitoring mask determination value THm1 (S502: YES), the process proceeds to S503, and abnormality monitoring using the ground potential difference ΔV is masked. At this time, the control may be changed so that the motor 80 is controlled by the independent drive instead of the cooperative drive.

In S504, the abnormality monitor unit 155 determines whether or not the absolute value of the estimated ground potential difference ΔV_est is greater than the correction execution determination value THm2. When it is determined that the absolute value of the estimated ground potential difference ΔV_est is greater than a correction execution determination value TH_m2 (S504: YES), the process proceeds to S505, and the ground potential difference ΔV calculated according to the terminal voltage is corrected with the estimated ground potential difference ΔV_est. In such case, abnormality monitoring is performed using a value obtained by correcting the ground potential difference ΔV with the estimated ground potential difference ΔV_est. When it is determined that the absolute value of the estimated ground potential difference ΔV_est is equal to or smaller than the correction execution determination value TH_m2 (S504: NO), the abnormality monitoring process using the ground potential difference ΔV is performed without performing the correction with the estimated ground potential difference ΔV_est.

The correction execution determination value THm2 is set to a value smaller than the monitoring mask determination value THm1. The correction execution determination value THm2 may be set to 0, and the correction based on the estimated ground potential difference ΔV_est may always be performed regardless of the estimated ground potential difference ΔV_est. Instead of using the ground potential difference ΔV, the abnormality determination threshold may be corrected based on the estimated ground potential difference ΔV_est. Further, the process of S504 and S505 may be omitted, and the correction with the estimated ground potential difference ΔV_est may be not performed. Furthermore, the processing of S502 and S503 may be omitted, correction with the estimated ground potential difference ΔV_est may be performed, and the monitoring mask may be omitted.

In the present embodiment, the control circuit units 150 and 250 calculate the estimated ground potential difference ΔV_est according to the ground potential fluctuation, and when the absolute value of the estimated ground potential difference ΔV_est is greater than the monitoring mask determination value THm1, ground abnormality monitoring based on the terminal voltage of a terminal to which the resistors 173, 273 are connected is temporarily stopped. In such manner, erroneous determination due to ground potential fluctuations caused by the external factors can be prevented.

The control circuit units 150 and 250 calculate the estimated ground potential difference ΔV_est corresponding to the ground potential fluctuation, and perform ground abnormality monitoring based on the ground potential difference ΔV corrected by the estimated ground potential difference ΔV_est. In such manner, the ground abnormality can be detected more appropriately. Effects similar to those of the embodiment described above are also achievable.

Fourth Embodiment

Figure 16:
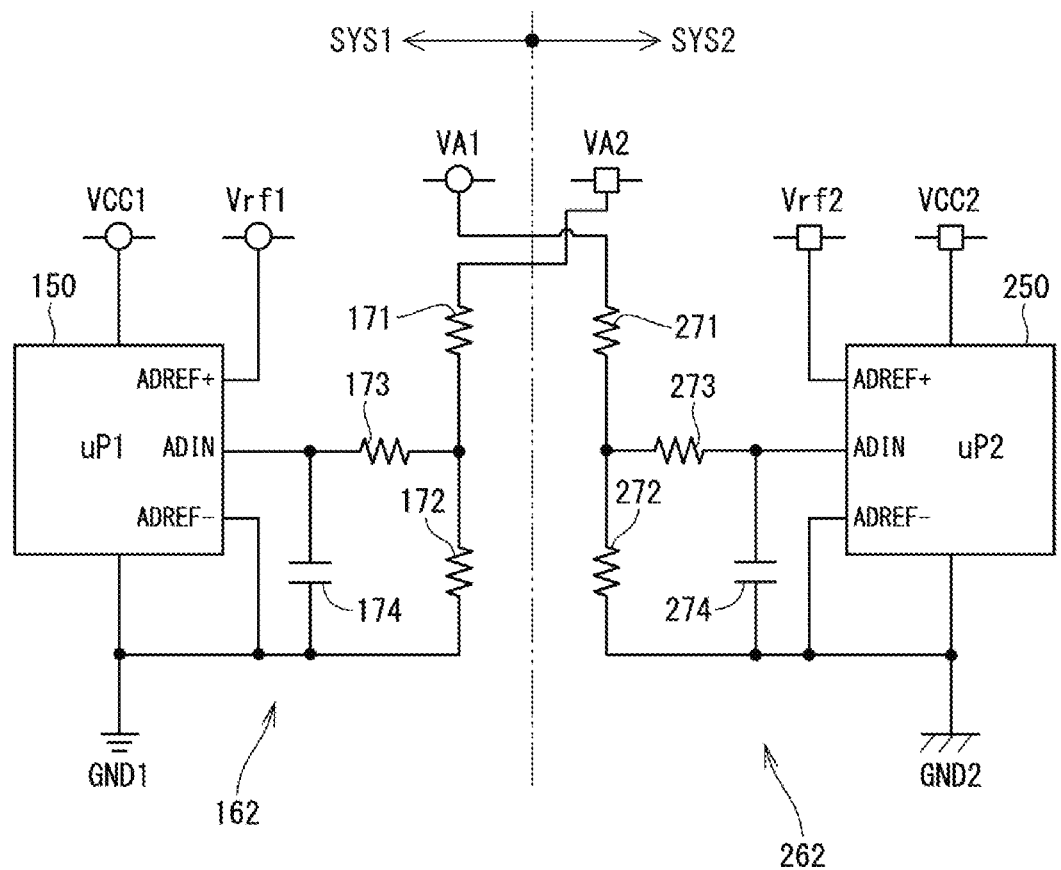
FIG. 16 is a circuit diagram of the ground monitor circuit according to a fourth embodiment.
Figure 17:
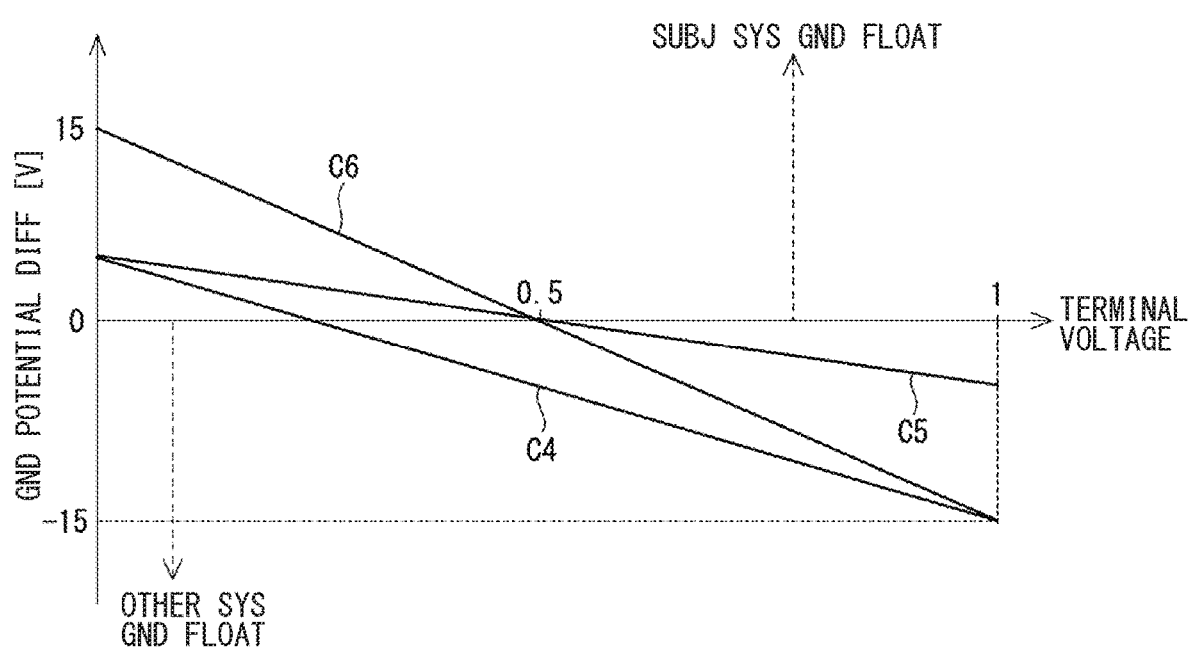
FIG. 17 is an explanatory diagram of the ground potential difference according to the fourth embodiment.

The fourth embodiment is shown in FIG. 16 and FIG. 17. The fourth to eighth embodiments respectively have a ground monitor circuit with different configuration from the one in the above embodiments. As shown in FIG. 16, in a first ground monitor circuit 162, one end of the resistor 171 is connected to the second pull-up resistor power source (i.e., a terminal marked as VA2), and the other end of the resistor 172 is connected to the first ground GND1 which is the subject system ground. This configuration is different from the first ground monitor circuit 161 of the first embodiment (see FIG. 6). Further, the second ground monitor circuit 262 is characterized in that one end of the resistor 271 is connected to the first pull-up resistor power source (i.e., a terminal marked as VA1) and the other end of the resistor 272 is connected to the second ground GND2 which is its subject system ground, which is different from the second ground monitor circuit 261 of the first embodiment.

When a pull-up resistor power source is taken from the other system, a difference may easily be caused between the pull-up resistor power source voltage of the other system and the ADC input reference voltage of the subject system. Such a difference may be correctable by performing an initial correction at a shipping time or at a power on time (i.e., when power consumption is low just after system startup), for achieving higher detection accuracy. It should be noted that the initial correction may also be performed in the same manner when the pull-up resistor power source is taken from the subject system as in the first embodiment.

As shown in FIG. 17, in the present embodiment, the positive/negative sign of the circuit characteristics is opposite to that of the first embodiment, and when the ground potential difference ΔV is greater than 0, the subject system ground is floating with respect to the other system ground. When the ground potential difference ΔV is smaller than 0, the other system ground is floating with respect to the subject system ground.

When the detection range is set to a range of −15 [V] to 5 [V] as indicated by a solid line C4, the values may be set such that, for example, Vrf=5 [V], VA=5 [V], ru=60 [kΩ], rd=20 [kΩ], and Radof=0.25.

When the detection range is set to a range of −5 [V] to 5 [V] as indicated by a solid line C5, the values may be set such that, for example, Vrf=5 [V], VA=5 [V], ru=50 [kΩ], rd=50 [kΩ], and Radof=0.5.

When the detection range is set to a range of −15 [V] to 15 [V] as indicated by a solid line C6, the values may be set such that, for example, Vrf=5 [V], VA=[5V], ru=50 [kΩ], rd=10 [kΩ], and Radof=0.5.

In the present embodiment, one end of each of the resistors 171 and 271 is connected to a pull-up power supply of the other system, and the other end of the resistors 171 and 271 is connected to the ground of the subject system via the resistors 172 and 272. Further, when the ground potential difference ΔV is greater than the positive abnormality determination threshold, it is determined as the ground abnormality of the subject system, and when the ground potential difference ΔV is smaller than the negative abnormality determination threshold, it is determined as the ground abnormality of the other system. The configuration described above also achieves the effects similar to those of the embodiments described above.

Fifth Embodiment, Sixth Embodiment

Figure 18:
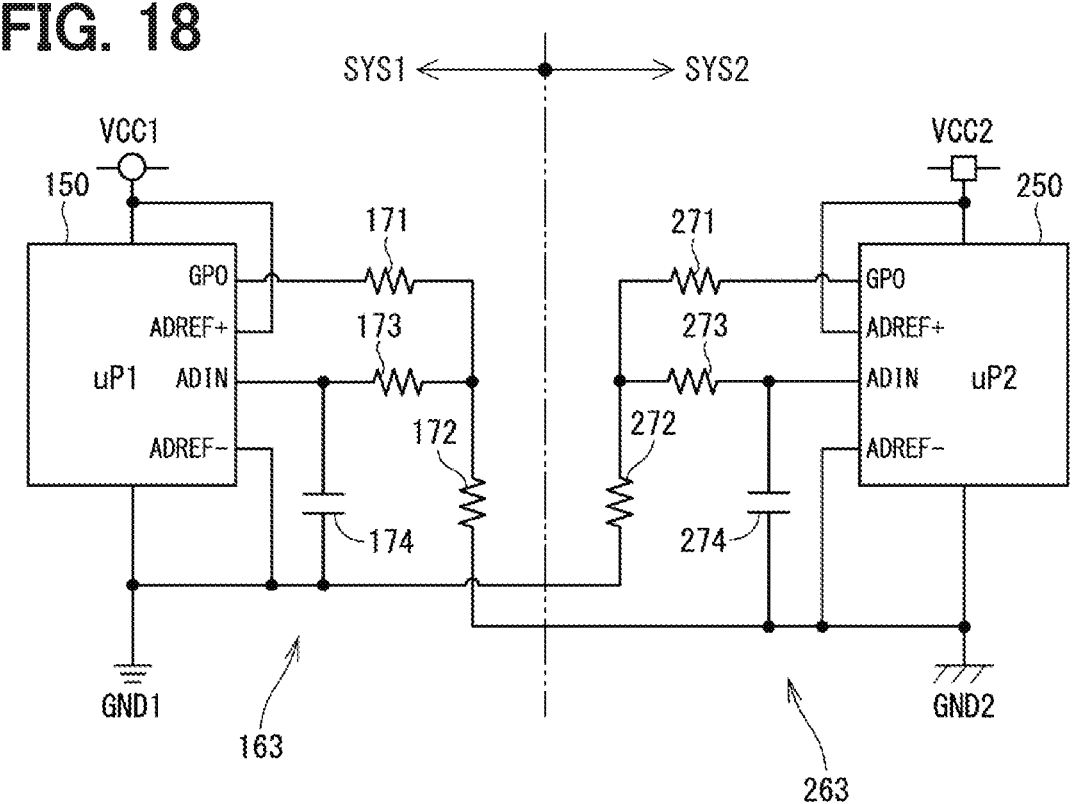
FIG. 18 is a circuit diagram of the ground monitor circuit according to a fifth embodiment.
Figure 19:
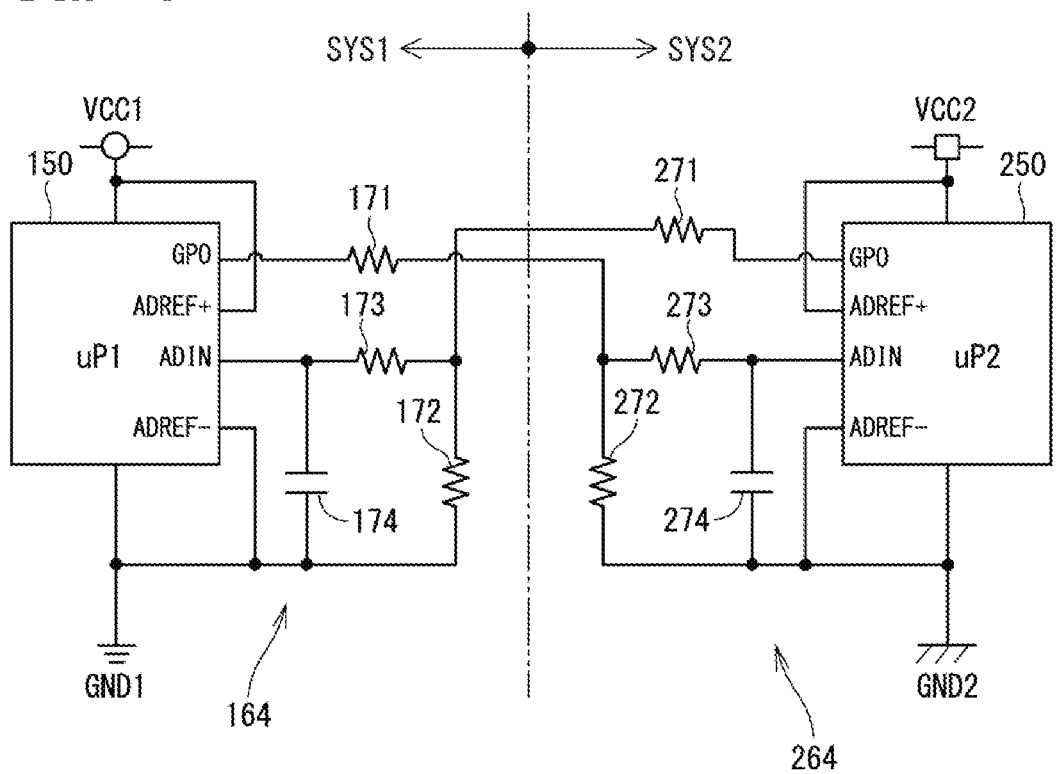
FIG. 19 is a circuit diagram of the ground monitor circuit according to a sixth embodiment.

The fifth embodiment and the sixth embodiment are shown in FIG. 18 and FIG. 19, respectively. A first ground monitor circuit 163 of the fifth embodiment is different from the first ground monitor circuit 161 of the first embodiment in that one end of the resistor 171 is connected to an output port of the first control circuit unit 150. Further, a second ground monitor circuit 263 is different from the second ground monitor circuit 261 of the first embodiment in that one end of the resistor 271 is connected to an output port of the second control circuit unit 250.

A first ground monitor circuit 164 of the sixth embodiment is different from the first ground monitor circuit 162 of the fourth embodiment in that one end of the resistor 271 is connected to an output port of the second control circuit unit 250.

The second ground monitor circuit 264 is different from the second ground monitor circuit 262 of the fourth embodiment in that one end of the resistor 171 is connected to an output port of the first control circuit unit 150. In the drawing, an output port is described as "GPO."

By pulling up the resistors 171 and 271 to the output port, the output can be turned on and off by the microcomputer, thereby the abnormality of the ground monitor circuits 163 and 263 can be detectable by, for example, the initial check.

In the present embodiment, one end of each of the resistors 171 and 271 is connected to an output terminal (?? output port in [0139] ??) of the control circuit unit 150 or 250 of the subject system or the other system, which serves as a voltage source. In the present embodiment, an output terminal to which the resistors 171 and 271 are connected is referred to as a "voltage source." In such manner, the power supply to the ground monitor circuit can be switched on and off, thereby the abnormality of the ground monitor circuit can be easily detected. Effects similar to those of the embodiment described above are also achievable.

Seventh Embodiment

Figure 20:
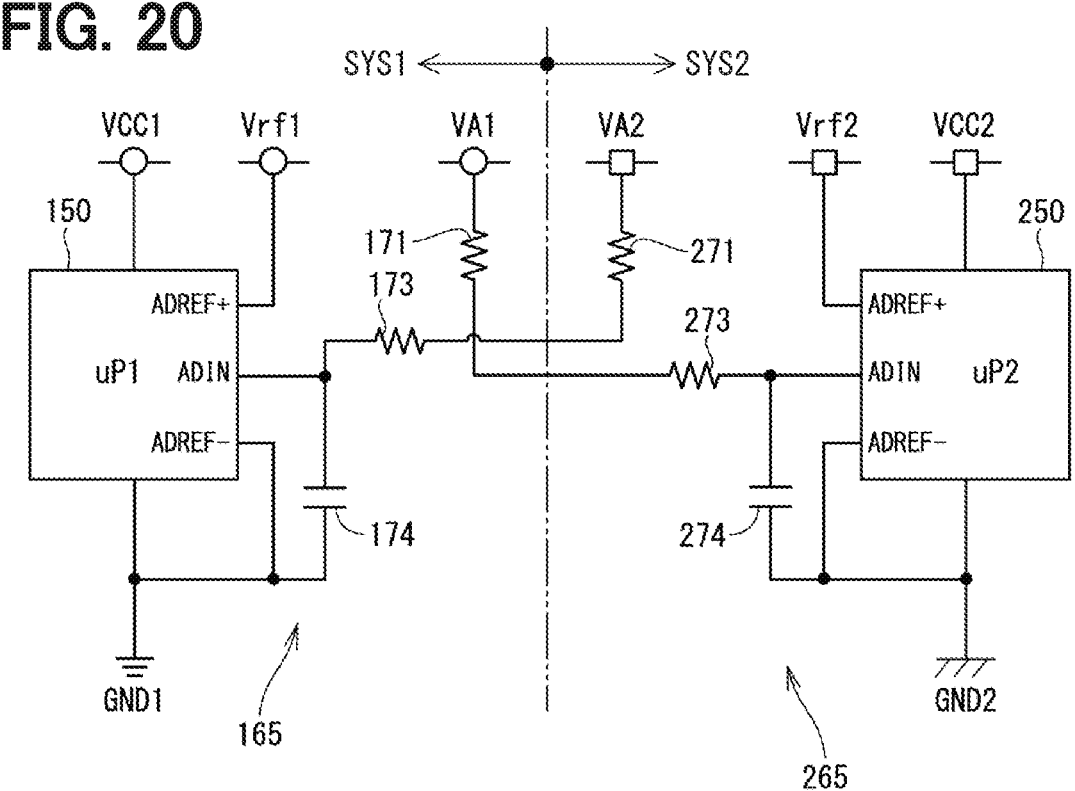
FIG. 20 is a circuit diagram of the ground monitor circuit according to a seventh embodiment.

The seventh embodiment is shown in FIG. 20. A first ground monitor circuit 165 and a second ground monitor circuit 265 of the seventh embodiment are respectively different from the ground monitor circuits 162 and 262 of the fourth embodiment in that the resistor 172 is omitted from the circuit 165 and the resistor 272 is omitted from the circuit 265. In such manner, although the ground floating of the subject system cannot be monitored, the ground floating of the other system can be monitored, and the configuration related to the ground monitor circuit can be simplified. Such a configuration also enables similar effects as those of the embodiments described above.

Eighth Embodiment

Figure 21:
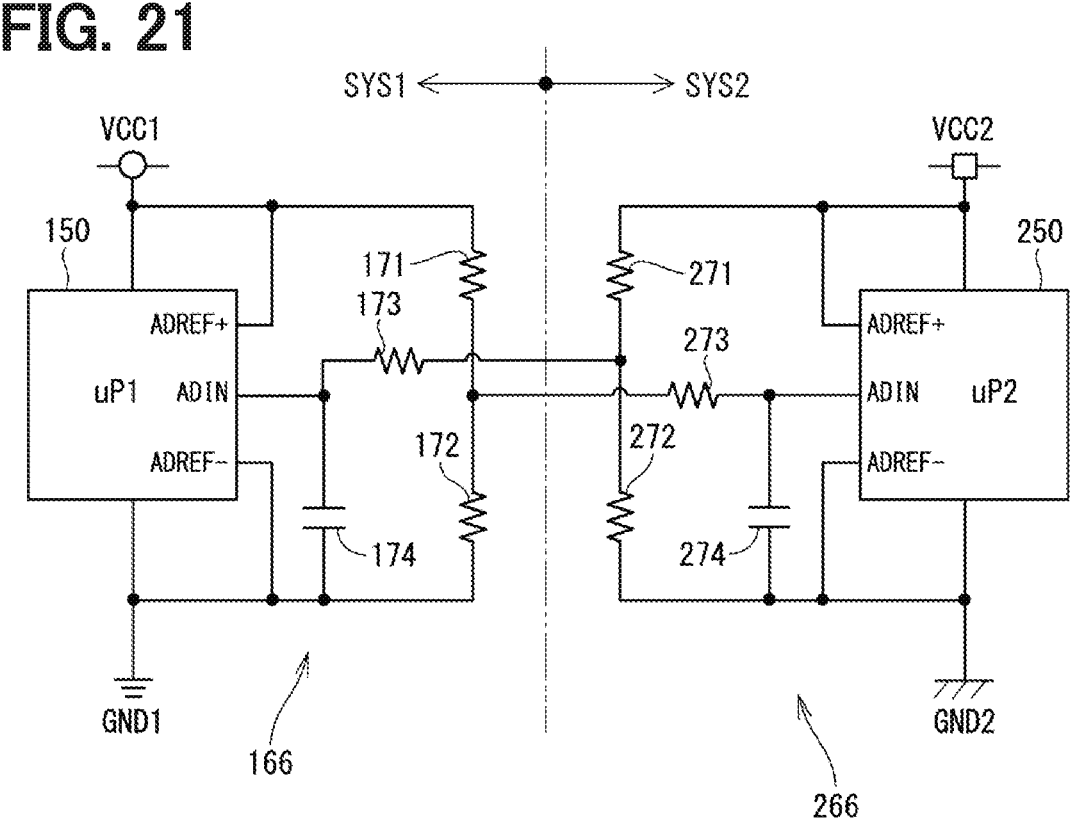
FIG. 21 is a circuit diagram of the ground monitor circuit according to an eighth embodiment.

The eighth embodiment is shown in FIG. 21. In a first ground monitor circuit 166 of the eighth embodiment, one end of the resistor 171 is connected to the circuit power source 137, and the other end of the resistor 172 is connected to the first ground GND1 that is the subject system ground.

Further, the ADREF+ terminal of the first control circuit unit 150 is connected to the circuit power source 137, and the ADREF− terminal is connected to the first ground GND1. Furthermore, the other end of the resistor 173 is connected to a position between the resistors 271 and 272 of a second ground monitor circuit 266.

In the second ground monitor circuit 266, one end of the resistor 271 is connected to the circuit power source 237, and the other end of the resistor 272 is connected to the second ground GND2, which is the subject system ground. Further, the ADREF+ terminal of the second control circuit unit 250 is connected to the circuit power source 237, and the ADREF− terminal is connected to the second ground GND2. Furthermore, the other end of the resistor 273 is connected to a position between the resistors 171 and 172 of the first ground monitor circuit 166. Such a configuration also enables similar effects as those of the embodiments described above.

In the above embodiments, the ECU 10 corresponds to a "control device", the resistors 171 and 271 correspond to a "first resistor" respectively, the resistors 173 and 273 correspond to a "second resistor" respectively, the resistors 172 and 272 correspond to a "third resistor" respectively, and the ADIN input terminal corresponds to an "input terminal." Further, the power supply relays 122 and 222 correspond to a "shut-down unit" respectively, and the other system relay monitor circuits 139 and 239 correspond to an "other system shut-down unit monitor circuit" respectively. As described in the first embodiment, the shut-down unit may be at least one of the inverters 120 and 220, the power supply relays 122 and 222, and the motor relays 125 and 225. Further, in the first control circuit unit 150, the second power supply relay 222 corresponds to an "other system shut-down unit," and, in the second control circuit unit 250, the first power supply relay 122 corresponds to an "other system shut-down unit."

Other Embodiment

In the first embodiment, the abnormality determination threshold is set to a value that reliably causes communication abnormality (e.g., 3 [V]). In other embodiments, the abnormality determination threshold may be set to a value that is greater than the inter-system ground potential difference at normal time (e.g., 0.8 [V]), which enables normal operation.

In such a case, for example, if the ground float of the first system exceeds the abnormality determination threshold, the first system may be controlled to perform a shutdown operation, and the second system may be controlled to transition to the single-system drive, after the confirmation of the shut-down of the first system by the communication or by the other system relay monitoring. In such a case, the position of a failure may be not identifiable due to the difference of the detection accuracy among the two systems, thereby the process change according to the position of a failure may preferably be performed by setting a threshold margin and/or an input filter margin for the adjustment between the two (i.e., subject/other) systems.

Further, for example, when the ground floating of the first system exceeds the abnormality determination threshold and communication is interrupted, the first system may be shut down and the second system may transition to the single-system drive after the confirmation of the shut down of the first system by the other system relay monitoring.

In the above embodiments, when an abnormality of the ground monitor circuit or the other system relay monitor circuit is detected by the initial check, the drive by the subject system is stopped. When an abnormality of the ground monitor circuit or the other system relay monitor circuit is detected, even though the monitoring becomes invalid, the energization control of the subject system can still be performable if the configuration other than the one related to the other system monitoring is normal. Therefore, in other embodiments, if it is determined in S204 of FIG. 10 that the ground monitor circuit is abnormal by the initial check, the drive control of the motor may be started by the normal drive, on condition that the drive system and the inter-microcomputer communication are normal. Similarly, if it is determined in S254 of FIG. 11 that the other system relay monitor circuit is abnormal by the initial check, the drive control of the motor may be started by the normal drive, if (i.e., on condition that) the drive system and the inter-microcomputer communication are normal. In such manner, even when the monitor circuit is abnormal, the output of the torque can be continued. Further, in other embodiments, when an abnormality in at least one of the ground monitor circuit and the other system relay monitor circuit is detected by the initial check, an other system monitoring function may be masked.

In the second embodiment, when an abnormality occurs in the ground monitor circuit or the other system relay monitor circuit in the in-drive monitoring process, the abnormality history is stored and the cooperative drive is continued. In such a case, when the ground monitor circuit or the other system relay monitor circuit is in an abnormal state and the inter-microcomputer communication becomes abnormal, the subject system may be stopped, or the drive control of the motor may still be continued by the independent drive or by the single-system drive, since the configuration related to the drive control of the motor is normal even with an abnormality of the monitor circuit.

In the above embodiment, two motor windings, two inverter units and two control circuit units are provided. In other embodiments, three or more systems may be provided by having three or more sets of motor winding, drive circuit and control circuit unit. Further, a plurality of control circuit units may be provided in one system, or a plurality of inverter units and motor windings may be provided for one control circuit unit. That is, system components may be provided in plurality in each of the plural system. Furthermore, one set of motor windings may be provided for a plurality of inverter units.

In the above embodiments, the rotating electric machine is a three-phase brushless motor. In other embodiments, the rotating electric machine is not limited to a brushless motor, but may be any type of motor. Further, the rotating electric machine is not limited to the motor, but may be a generator, or may be a motor-generator having both functions of the motor and the generator. In the above embodiments, the control device is applied to an electric power steering apparatus. In other embodiments, the control device may be applied to the other apparatuses different from the electric power steering apparatus. When applied to the other apparatuses, the control object may be other than the motor.

The control unit described in the present disclosure and the method thereof may be realized by a dedicated computer that is configured as a combination of a processor and a memory programmed to perform one or more functions embodied by a computer program. Alternatively, the control unit described in the present disclosure and the method thereof may be realized by a dedicated computer that is provided as a configuration of a processor including one or more dedicated hardware logic circuits. Alternatively, the control unit and the method described in the present disclosure may be realized by one or more dedicated computers which is provided as a combination of (i) a processor and a memory programmed to perform one or more functions and (ii) a processor configured by one or more hardware logic circuits. Further, the computer programs mentioned above may be stored, as instructions executable by a computer, in a tangible, non-transitory, computer-readable storage medium. The present disclosure is not limited to the above embodiments, but may encompass various modifications implementable without departing from the spirit of the present disclosure.

What is claimed is:

1. A control device comprising:
   a plurality of control circuit units each respectively connected to separate circuit power sources and separate grounds, wherein each of a plurality of systems comprises one of the plurality of control circuit units and a circuit power source corresponding thereto, one of the plurality of systems being designated as a subject system and a remainder of the plurality systems being designated as an other system or other systems; and
   a ground monitor circuit connected to a subject system, the subject system comprising a first resistor, a second resistor, a capacitor and a voltage source, the first resistor having one end connected to a voltage source, the second resistor having one end connected to an input terminal of a control circuit unit corresponding thereto, and the capacitor having one end connected to a position between the second resistor and the input terminal, and the capacitor having an other end connected to a first ground, the first ground comprising the ground of the subject system, wherein
   at least one of the one end of the first resistor, an other end of the first resistor, and an other end of the second resistor is connected to the subject system, and at least one of the one end of the first resistor, the other end of the first resistor, and the other end of the second resistor is connected to the other system, and
   the control circuit unit is configured to;
   monitor a second ground for abnormality based on a terminal voltage of the input terminal to which the second resistor is connected, the second ground comprising the ground of the other system;
   calculate, based on the terminal voltage, a ground potential difference that is potential difference between the first ground and the second ground;
   determine that an abnormality is caused in one of the first ground or the second ground when the ground potential difference is greater than a positive abnormality determination threshold, and
   determine that the abnormality is caused in an other one of the first ground or the second ground when the ground potential difference is smaller than a negative abnormality determination threshold,
   wherein
   each system is provided with a shut-down unit that is shut down when the abnormality is caused in the subject system, and an other system shut-down unit monitor circuit obtaining a state of a shut-down unit of the other system, and
   the control circuit unit is mutually communicable with rest of the plurality of control circuit units, and is configured to determine an abnormal state of the subject system and the other system according to the ground potential difference, a state of the communication among the plurality of control circuit units, and the state of the shut-down unit of the other system, and changes control according to the determined abnormal state, and
   wherein
   the control circuit unit is configured to perform a normal-time control using information shared by communication among the plurality of control circuit units at normal time, and
   in case that the communication among the plurality of control circuit units is not normal,
   the control circuit unit is configured to;
   perform a control by the other system by determining a ground abnormality of one system when the ground potential difference is outside a normal range;
   perform an independent control without using the information shared by communication among the plurality of control circuit units when the ground potential difference is within the normal range and the shut-down unit of the other system is normal; and
   perform a control by the subject system when the ground potential difference is within the normal range and the shut-down unit of the other system is abnormal.

2. The control device according to claim 1, wherein
   the ground monitor circuit has a third resistor with one end connected to a connection point between the first resistor and the second resistor and with an other end connected to the second ground, and
   the control circuit unit is configured to monitor abnormality of the first ground and abnormality of the second ground based on the terminal voltage.

3. The control device according to claim 2, wherein
   the one end of the first resistor is connected to a pull-up resistor power source of the subject system, and
   the other end of the first resistor is connected to the second ground via the third resistor.

4. The control device according to claim 3, wherein
   the pull-up resistor power source is provided separately from the circuit power source.

5. The control device according to claim 2, wherein
   the one end of the first resistor is connected to a pull-up resistor power source of the other system, and
   the other end of the first resistor is connected to the first ground via the third resistor.

6. The control device according to claim 2, wherein
   the other end of the second resistor is connected to a position between the first resistor and the third resistor of the other system.

7. The control device according to claim 1, wherein
   the one end of the first resistor is connected to an output terminal of the control circuit unit of the subject system or the other system as the voltage source.

8. The control device according to claim 1, wherein
the control circuit unit is configured to determine that the ground monitor circuit is abnormal when the communication among the plurality of control circuit units is normal and the ground potential difference is outside the normal range.

9. The control device according to claim 8, wherein
the control circuit unit is configured to perform abnormality determination of the ground monitor circuit before starting a control of a control object.

10. The control device according to claim 1, wherein
when the communication among the plurality of control circuit units is normal and the ground potential difference is within the normal range and abnormality of the shut-down unit of the other system is detected, the control circuit unit is configured to determine that the other system shut-down unit monitor circuit is abnormal.

11. The control device according to claim 10, wherein
the control circuit unit is configured to perform an abnormality determination of the shut-down unit monitor circuit of the other system before starting a control of a control object.

12. The control device according to claim 1, wherein
the control circuit unit is configured to calculate an estimated ground potential difference according to a ground voltage fluctuation, and perform ground abnormality monitoring based on the ground potential difference corrected by the estimated ground potential difference.

13. The control device according to claim 1, wherein
the control circuit unit is configured to calculate the estimated ground potential difference according to a ground voltage fluctuation, and stop the ground abnormality monitoring based on the terminal voltage when an absolute value of the estimated ground potential difference is greater than a monitoring mask determination value.

14. A control device comprising:
a first system including: a first system ground, a first control circuit, and a first ground monitor circuit; and
a second system including: a second system ground, a second control circuit, and a second ground monitor circuit,
wherein the first ground monitor circuit includes a first pull-up resistor and a first pull-down resistor configured to form a first voltage dividing circuit that divides a first voltage created between a first pull-up resistor power source and the second system ground,
wherein a bottom end of the first pull-up resistor is connected at a first central node to a top end of the first pull-down resistor,
wherein the first central node is connected directly or indirectly to a divided voltage input terminal of the first control circuit to provide a first divided voltage,
wherein the second ground monitor circuit includes a second pull-up resistor and a second pull-down resistor configured to form a second voltage dividing circuit that divides a second voltage created between a second pull-up resistor power source and the first system ground, and
wherein the second control circuit receives a second divided voltage at a divided voltage input terminal of the second control circuit,
wherein the control device is configured to determine a ground potential difference between the first system ground and the second system ground based upon the first divided voltage and the second divided voltage,
wherein upon a determination that the ground potential difference is greater than a positive abnormality determination threshold, a ground fault status is set to indicate a second-system ground fault,
wherein upon a determination that the ground potential difference is less than a negative abnormality determination threshold, the ground fault status is set to indicate a first-system ground fault,
wherein upon a determination that ground potential difference is less than or equal to the positive abnormality determination threshold and is greater than or equal to the negative abnormality determination threshold, the ground fault status is set to indicate that the system grounds are normal,
wherein the control device is configured to determine that the first ground monitor circuit is normal upon a determination an absolute value of the ground potential difference is less than or equal to a communication abnormality determination threshold,
wherein the control device is configured to perform an initial monitoring process upon a determination that the first ground monitor circuit is normal,
wherein the initial monitoring process includes selecting one of four driving processes: a cooperative drive process, second system stop process, a single system drive process, and an independent drive process,
wherein the cooperative driving process is selected upon a determination that: an inter-microcomputer communication is normal and a second system relay is normal,
wherein the second system stop process is selected upon a determination that: the inter-microcomputer communication is normal and the second system relay is NOT normal,
wherein the single system drive process is selected upon a determination that: the inter-microcomputer communication is NOT normal and the second system relay is NOT normal,
wherein the independent drive process is selected upon a determination that the inter-microcomputer communication is NOT normal and the second system relay is normal.

* * * * *